United States Patent
DePopas et al.

(10) Patent No.: US 12,271,895 B2
(45) Date of Patent: *Apr. 8, 2025

(54) SYSTEMS AND METHODS FOR ELECTRONIC TRANSACTIONS SERVICE ENROLLMENT AND EXECUTING TOKENIZED TRANSACTIONS

(71) Applicant: SKIPIFY, INC., San Francisco, CA (US)

(72) Inventors: Ashleigh D. DePopas, Denver, CO (US); Ian Hillis, Denver, CO (US); Richard Scheffrin, Georgetown, TX (US); Steven Walchek, Denver, CO (US)

(73) Assignee: SKIPIFY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,534

(22) Filed: Nov. 30, 2020

(65) Prior Publication Data
US 2021/0383364 A1    Dec. 9, 2021

Related U.S. Application Data

(60) Provisional application No. 62/705,037, filed on Jun. 8, 2020.

(51) Int. Cl.
*G06Q 20/36* (2012.01)
*G06F 3/0482* (2013.01)
(Continued)

(52) U.S. Cl.
CPC ....... *G06Q 20/3674* (2013.01); *G06F 3/0482* (2013.01); *G06Q 20/027* (2013.01);
(Continued)

(58) Field of Classification Search
CPC ............. G06Q 20/3674; G06Q 20/227; G06Q 20/363; G06Q 20/3672; G06Q 20/385;
(Continued)

(56) References Cited

U.S. PATENT DOCUMENTS

| 10,546,292 B1* | 1/2020 | Karaivanov ......... G06Q 20/065 |
| 2009/0106152 A1* | 4/2009 | Dill ...................... G06Q 20/326 705/44 |

(Continued)

FOREIGN PATENT DOCUMENTS

EP            2759969 A1 *  7/2014  ............. G06Q 20/10

OTHER PUBLICATIONS

"GATCOIN Unveils New Crypto Currency "Airdrop" Technology", Canada NewsWire, Sep. 28, 2017 (Year: 2017).*
(Continued)

*Primary Examiner* — Duan Zhang
(74) *Attorney, Agent, or Firm* — SU IP CONSULTING

(57) ABSTRACT

Systems and methods are disclosed for executing an electronic transaction using a digital wallet. One method includes receiving electronic transaction information from an electronic transaction browser. An account enrollment status may be determined based on the electronic transaction information by a digital wallet system. The digital wallet system may generate a verification request based on the account enrollment status. The digital wallet system may receive user verification information via the graphical interface. The digital wallet system may also generate or verify a user account in the digital wallet system based on the account enrollment status and the user verification information. In one aspect, the digital wallet system may receive a request to complete an electronic transaction based on the electronic transaction information received from the electronic transaction browser. In another aspect, the digital
(Continued)

wallet system may generate a token based on the request to complete the electronic transaction.

20 Claims, 16 Drawing Sheets

(51) Int. Cl.

| | | |
|---|---|---|
| *G06Q 20/02* | (2012.01) | |
| *G06Q 20/22* | (2012.01) | |
| *G06Q 20/38* | (2012.01) | |
| *G06Q 20/40* | (2012.01) | |
| *G06Q 20/42* | (2012.01) | |
| *G06Q 30/0207* | (2023.01) | |
| *G06Q 30/0226* | (2023.01) | |
| *G06Q 30/06* | (2023.01) | |
| *G06Q 30/0601* | (2023.01) | |
| *G06Q 40/03* | (2023.01) | |
| *H04L 9/40* | (2022.01) | |

(52) U.S. Cl.
CPC ......... *G06Q 20/227* (2013.01); *G06Q 20/363* (2013.01); *G06Q 20/367* (2013.01); *G06Q 20/3672* (2013.01); *G06Q 20/385* (2013.01); *G06Q 20/40* (2013.01); *G06Q 20/4014* (2013.01); *G06Q 20/42* (2013.01); *G06Q 30/0233* (2013.01); *G06Q 30/0236* (2013.01); *G06Q 30/0641* (2013.01); *G06Q 40/03* (2023.01); *H04L 63/0838* (2013.01)

(58) Field of Classification Search
CPC .... G06Q 20/40; G06Q 20/4014; G06Q 20/42; G06Q 30/0233; G06Q 30/0236; G06Q 30/0641; G06Q 40/025; G06Q 30/0633; G06Q 30/0601; G06Q 20/027; G06Q 20/367; G06Q 20/38215; G06Q 20/409; G06F 3/0482; H04L 63/0838; H04L 2463/082; H04L 63/0807
See application file for complete search history.

(56) References Cited

U.S. PATENT DOCUMENTS

| | | | |
|---|---|---|---|
| 2013/0268437 A1* | 10/2013 | Desai | G06Q 20/36 705/41 |
| 2014/0351126 A1 | 11/2014 | Priebatsch | |
| 2015/0339666 A1 | 11/2015 | Wilson et al. | |
| 2016/0092878 A1* | 3/2016 | Radu | G06Q 20/4012 705/72 |
| 2016/0173483 A1* | 6/2016 | Wong | H04W 12/06 726/9 |
| 2016/0275491 A1* | 9/2016 | Kaladgi | H04L 63/0853 |
| 2017/0193471 A1* | 7/2017 | Kettler | G06Q 20/102 |

OTHER PUBLICATIONS

International Search Report and Written Opinion issued on Oct. 7, 2021 in counterpart International Application No. PCT/US2021/036350 (12 pages, in English).

* cited by examiner

FIG. 8A

802 — EXPRESS CHECKOUT
PLEASE ENTER YOUR EMAIL ADDRESS TO LOG IN OR SIGN UP.

806 — EMAIL ADDRESS

808 — CONTINUE WITH EXPRESS CHECKOUT

ORDER SUMMARY    $117.50 USD
CHECK OUT AS A GUEST
⊕ ADD A DISCOUNT CODE OR GIFT CARD

SUBTOTAL    $117.50 USD
SHIPPING
TOTAL    $117.50 USD

810 — CONTACT INFORMATION
EMAIL ADDRESS ...@EMAIL.COM
PHONE NUMBER (...)...-309

BILLING ADDRESS
FIRST NAME
COMPANY NAME (OPTIONAL)
ADDRESS
APARTMENT, SUITE, ECT (OPTIONAL)

812 — PROMOTIONS
PROMO CODE [APPLY]
DEALS AND PROMOTIONS
OFFERS

USE EXPRESS CHECKOUT   X
Ⓐ (...)...-309 @EMAIL.COM
PLEASE ENTER THE CODE SENT TO (...)...-309 TO CONTINUE YOUR PURCHASE WITH EXPRESS CHECKOUT
☐ ☐ ☐ ☐
HAVEN'T RECEIVED YOUR ACCESS CODE?
YOU CAN REVIEW YOUR DETAILS ON THE NEXT STEP.
CONTINUE AS GUEST

SQUARE   $64.28 USD
DUCKS   $53.22 USD
  $117.50 USD
  FREE
TAXES   $8.95

SYSTEMS AND METHODS FOR ELECTRONIC TRANSACTIONS SERVICE ENROLLMENT AND EXECUTING TOKENIZED TRANSACTIONS

PRIORITY

This application claims the benefit of priority from Provisional Application No. 62/705,037 filed Jun. 8, 2020, which is hereby incorporated herein by reference in its entirety

TECHNICAL FIELD

The present disclosure relates generally to the field of electronic transactions and, more particularly, to systems and methods for electronic transactions service enrollment and executing tokenized transactions.

BACKGROUND

Digital wallets store consumer credentials and payment information to enable consumers to make electronic purchases and perform other online financial transactions. Typically, customers enroll into digital wallet services on merchant websites. The customers, however, are required to manually enter personal and financial information into a lengthy list of input fields provided on the merchant website in order to enroll into digital wallet services. The present disclosure is directed to addressing these and other drawbacks to existing digital wallet services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method for executing an electronic transaction using a digital wallet, comprising: receiving, from an electronic transaction browser, electronic transaction information; determining, by a digital wallet system, an account enrollment status based on the electronic transaction information; generating, by the digital wallet system, a verification request based on the account enrollment status; displaying, on the electronic transaction browser, the verification request via a graphical interface; receiving, by the digital wallet system, user verification information via the graphical interface; generating or verifying, by the digital wallet system, a user account in the digital wallet system based on the account enrollment status and the user verification information; receiving, by the digital wallet system, a request to complete an electronic transaction based on the electronic transaction information received from the electronic transaction browser; generating, by the digital wallet system, a token based on the request to complete the electronic transaction; and completing, by the digital wallet system, the electronic transaction in accordance with the electronic transaction information.

One embodiment provides a system comprising: one or more computer readable media storing instructions for executing an electronic transaction using a digital wallet; and one or more processors configured to execute the instructions to perform operations comprising: receiving, from an electronic transaction browser, electronic transaction information; determining, by a digital wallet system, an account enrollment status based on the electronic transaction information; generating, by the digital wallet system, a verification request based on the account enrollment status; displaying, on the electronic transaction browser, the verification request via a graphical interface; receiving, by the digital wallet system, user verification information via the graphical interface; generating or verifying, by the digital wallet system, a user account in the digital wallet system based on the account enrollment status and the user verification information; receiving, by the digital wallet system, a request to complete an electronic transaction based on the electronic transaction information received from the electronic transaction browser; generating, by the digital wallet system, a token based on the request to complete the electronic transaction; and completing, by the digital wallet system, the electronic transaction in accordance with the electronic transaction information.

One embodiment provides a non-transitory computer-readable medium storing instructions for executing an electronic transaction using a digital wallet, the instructions, when executed by one or more processors, causing the one or more processors to perform operations comprising: receiving, from an electronic transaction browser, electronic transaction information; determining, by a digital wallet system, an account enrollment status based on the electronic transaction information; generating, by the digital wallet system, a verification request based on the account enrollment status; displaying, on the electronic transaction browser, the verification request via a graphical interface; receiving, by the digital wallet system, user verification information via the graphical interface; generating or verifying, by the digital wallet system, a user account in the digital wallet system based on the account enrollment status and the user verification information; receiving, by the digital wallet system, a request to complete an electronic transaction based on the electronic transaction information received from the electronic transaction browser; generating, by the digital wallet system, a token based on the request to complete the electronic transaction; and completing, by the digital wallet system, the electronic transaction in accordance with the electronic transaction information.

BRIEF DESCRIPTION OF THE DRAWINGS

The accompanying drawings, which are incorporated in and constitute a part of this specification, illustrate several embodiments and together with the description, serve to explain the principles of the disclosure.

FIGS. 7A, 7B, 8A, and 8B show exemplary interfaces for executing a digital wallet enrollment and/or transaction, according to one aspect of the present disclosure.

DETAILED DESCRIPTION OF EMBODIMENTS

Figure 1:
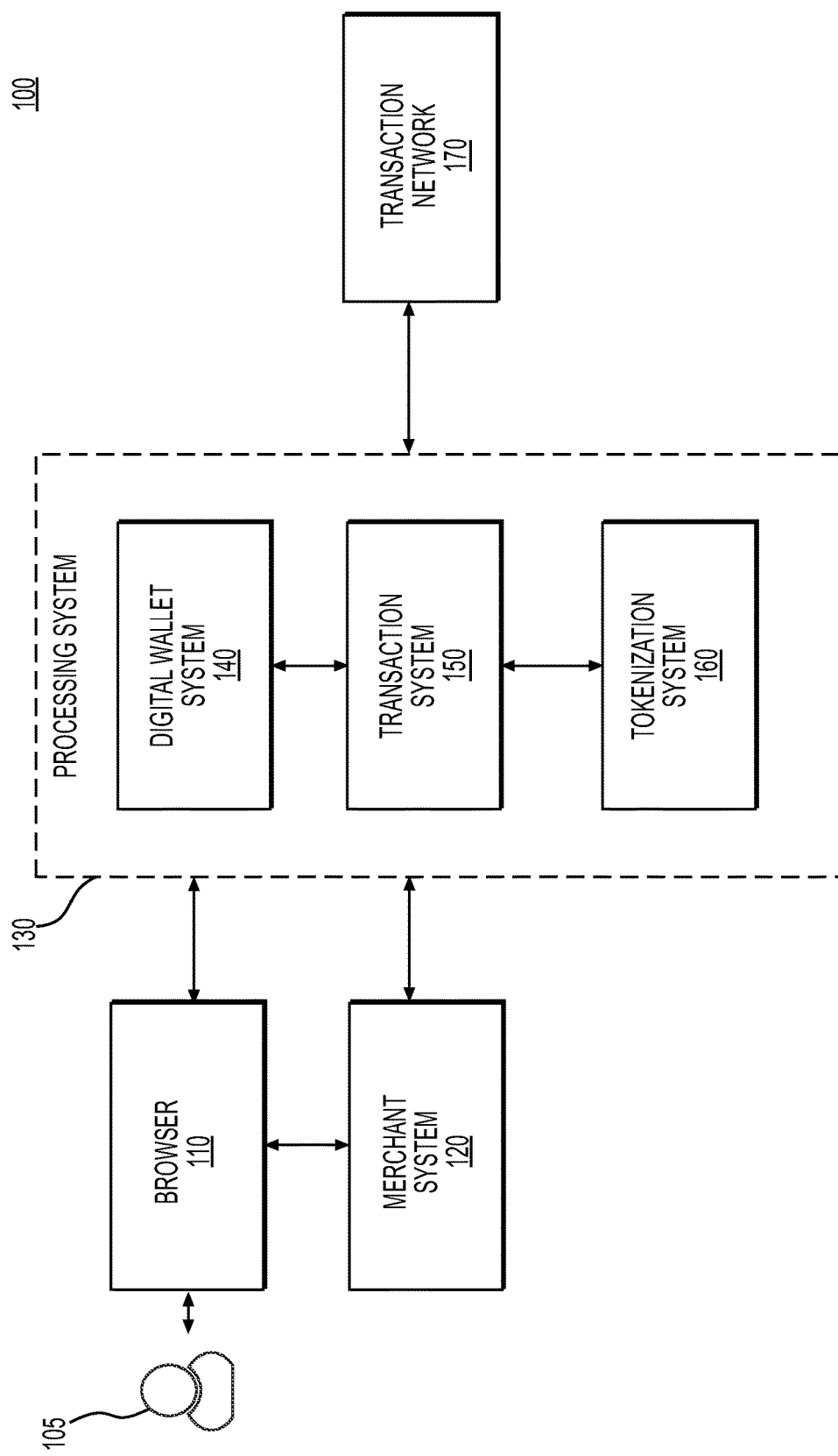
FIG. 1 depicts a block diagram of an exemplary electronic transaction system, according to one aspect of the present disclosure.

The following embodiments describe systems and methods for securely and efficiently facilitating electronic transactions using a digital wallet. More particularly, the embodiments contemplated in the present disclosure may enable merchants and customers to utilize a digital wallet service provided by a processing system, which may be configured to perform digital wallet transactions, tokenization of sensitive user and payment data, and/or electronic transaction authorizations.

Conventionally, digital wallet systems and services utilize techniques to solicit user enrollment during various online transactions, such as during online shopping. However, such techniques require users (or customers) to manually input information (e.g., name, email address, physical address, credit card information, bank account information, etc.) into a lengthy list of data fields on a website in order to establish digital wallet accounts. Such a requirement causes friction that turns many users away prematurely, causing abandonment of the digital wallet enrollment process or online shopping altogether. The users who opt-out of enrolling into the digital wallet services and choose to complete their online purchase transactions through guest checkouts face similar issues. That is, the users who choose guest checkouts must also manually enter lengthy personal and financial information in order to complete their purchases, causing inconvenience and potential abandonment of purchase transactions. Moreover, many users are hesitant about enrolling in digital wallet services due to security concerns regarding their personal and financial credentials.

To address the above-noted problems, the present disclosure describes digital wallet systems and methods that facilitate a digital wallet enrollment and/or transaction process before, during, or after a purchase transaction. For example, the digital wallet system of the present disclosure may determine, before completing a purchase transaction, whether a user is enrolled in the digital wallet system. The user enrollment may be determined based on the information (e.g., email address or phone number) that the user has provided during a previous purchase transaction. If the user is not enrolled in the digital wallet service, the digital wallet system may initiate a digital wallet enrollment process by performing a one-time password authentication (OTPA) or a two-factor authentication (2FA) with the user. Additionally or alternatively, the digital wallet system of the present disclosure may determine whether a user is enrolled in the digital wallet system during guest checkout or express checkout (e.g., a service provided by the digital wallet system). If the user is enrolled in the digital wallet system, the digital wallet system may provide various digital wallet services (e.g., express checkout, auto-populating saved user data, tokenization, payment options, etc.). If the user is not enrolled in the digital wallet system, however, the digital wallet system may initiate an enrollment process after completing the purchase transaction. As such, users may utilize the digital wallet services offered by the digital wallet system without friction, regardless of whether the user chooses to complete the purchase transaction via a guest checkout or an express checkout. Moreover, the digital wallet system of the present disclosure may generate or exchange digital wallet tokens based on the payment information provided by the users and merchants who are enrolled in the digital wallet system, eliminating security concerns regarding any sensitive user data provided during the purchase transactions.

It should be appreciated that particular consideration is made herein to purchase transactions relating to merchants. Despite this reference to purchase transactions relating to merchants, certain disclosed systems and methods may apply equally well to the various e-commerce transactions. Effectively, any circumstance where sensitive data, such as a PAN, a PIN, a social security number, etc., or a token corresponding thereto, is being transmitted over a network, systems and methods disclosed herein may be employed. Further, while the party seeking to initiate a secure transaction and/or provide a third-party service may be referred to herein as a "merchant," a party seeking to initiate a secure transaction need not be a merchant, but may be a service provider, or any party seeking to execute a transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary electronic transaction system 100 including a browser 110, a merchant system 120, and a processing system 130, which is in communication with a transaction network 170. The browser 110 may display a website hosted by the merchant system 120. The browser 110 may be a client-side browser on a user computing device, but may also be a client-side app or website for performing e-commerce electronic transactions, or any other type of software or application on a client-side data processor. A user 105 may access the website hosted by the merchant system 120 via the browser 110 to perform e-commerce transactions. For example, the user 105 may visit an online store to perform a purchase transaction (e.g., purchasing products or services). The user 105 may provide personal data (e.g., an email address, a mailing address, a phone number, etc.), as well as payment data (e.g., a personal account number (PAN), a personal identification number (PIN), a credit card number, a loyalty point account number, a gift card number, bank account number, a social security number, etc.) in the browser 110 to complete the purchase transactions. The browser 110 may then provide the personal and payment data to the merchant system 120 and/or the processing system 130. The browser 110 may interact with the merchant system 120 to complete the purchase transactions, and/or may also directly communicate with the processing system 130 to complete the purchase transactions.

Still referring to FIG. 1, the processing system 130 comprises a digital wallet system 140, a transaction system 150, and a tokenization system 160. In one embodiment, the digital wallet system 140 may provide digital wallet service(s) (e.g., offer to enroll in the digit wallet service or to make payments using the digital wallet service) to the user 105. Further, the digital wallet system 140 may provide a digital wallet interface to the merchant system 120. The merchant system 120 may integrate the digital wallet interface provided by the digital wallet system 140 to display the digital wallet interface on the browser 110. The user 105 may then utilize the digital wallet interface to perform various e-commerce transactions (further described below in detail). The digital wallet system 140 may communicate with the transaction system 150 to perform digital wallet transactions (e.g., digital wallet enrollment and services) and purchase transactions.

The transaction system 150 may comprise a plurality of systems, including a server for receiving and storing the sensitive user data. Further, the transaction system 150 may communicate with the tokenization system 160 and the transaction network 170 to perform the digital wallet transactions and the payment authorization process of the present disclosure. The transaction network 170 may include payment networks, issuer systems, and/or acquirer systems facilitate the authorization or approval of various electronic transaction request (e.g., e-commerce transactions). The transaction system 150 may transmit payment information (e.g., method of payment, merchant payment tokens, etc.) to the tokenization system 160. The tokenization system 160 may then tokenize the payment information received from the transaction system 150 to generate a token for authenticating and authorizing purchase transactions. A token may be a low-value token or a high-value token. Further, a token may be a randomly generated number. In other embodiments, a token may be a pseudorandom number, encrypted information, or other character sequence. The processing system 130 may transmit a token (e.g., a digital wallet token) generated by the tokenization system 160 to the merchant system 120, such that the merchant system 120 may store the token for future transactions. The token may be unique per transaction, per user, and/or per merchant or organization. Thus, if a given user makes a purchase at merchant A, token A may be generated, but if the user makes a purchase at merchant B, even if the same payment method is used, token B may be generated. By utilizing a token, the merchant system 120 may not need to send payment information (e.g., debit or credit card information) or other sensitive data for subsequent transactions, and may instead use the token. Therefore, tokenization may enhance data security as well as merchants' convenience in processing subsequent electronic transactions.

Still referring to FIG. 1, the processing system 130 may store personal data and payment data provided by the user 105 in a server(s) or a database(s) (not shown) for further processing. Further, the processing system 130 may transmit personal data and payment data to the digital wallet system 140, transaction system 150, and/or tokenization system 160 to complete purchase transactions, provide digital wallet service(s), and perform tokenization of payment data (further described below in detail). The processing system 130 may communicate with the transaction network 170 to authorize payments requested by the merchant system 120 based on the personal and payment data provided by the user 105 during purchase transactions.

Still referring to FIG. 1, the processing system 130, may be an intermediary in the system 100 to ensure validity of an electronic payment request, and to provide digital wallet services and tokenization services via the digital wallet system 140 and the tokenization system 160, respectively. The processing system 130 may transmit an electronic payment request (e.g., an authentication request and/or authorization request) to the transaction network 170 and receive a response indicating a result of the electronic payment request (e.g., an authentication request and/or an authorization response). For example, when the merchant system 120 transmits an authorization request for an online purchase transaction, the processing system 130 may act, via the transaction system 150, as an intermediary for the merchant system 120 and transmit the authorization request to the transaction network 170. The processing system 130 may also receive an authorization response with a result of the authorization request from the transaction network 170, and may transmit the authorization response to the merchant system 120.

Figure 2:
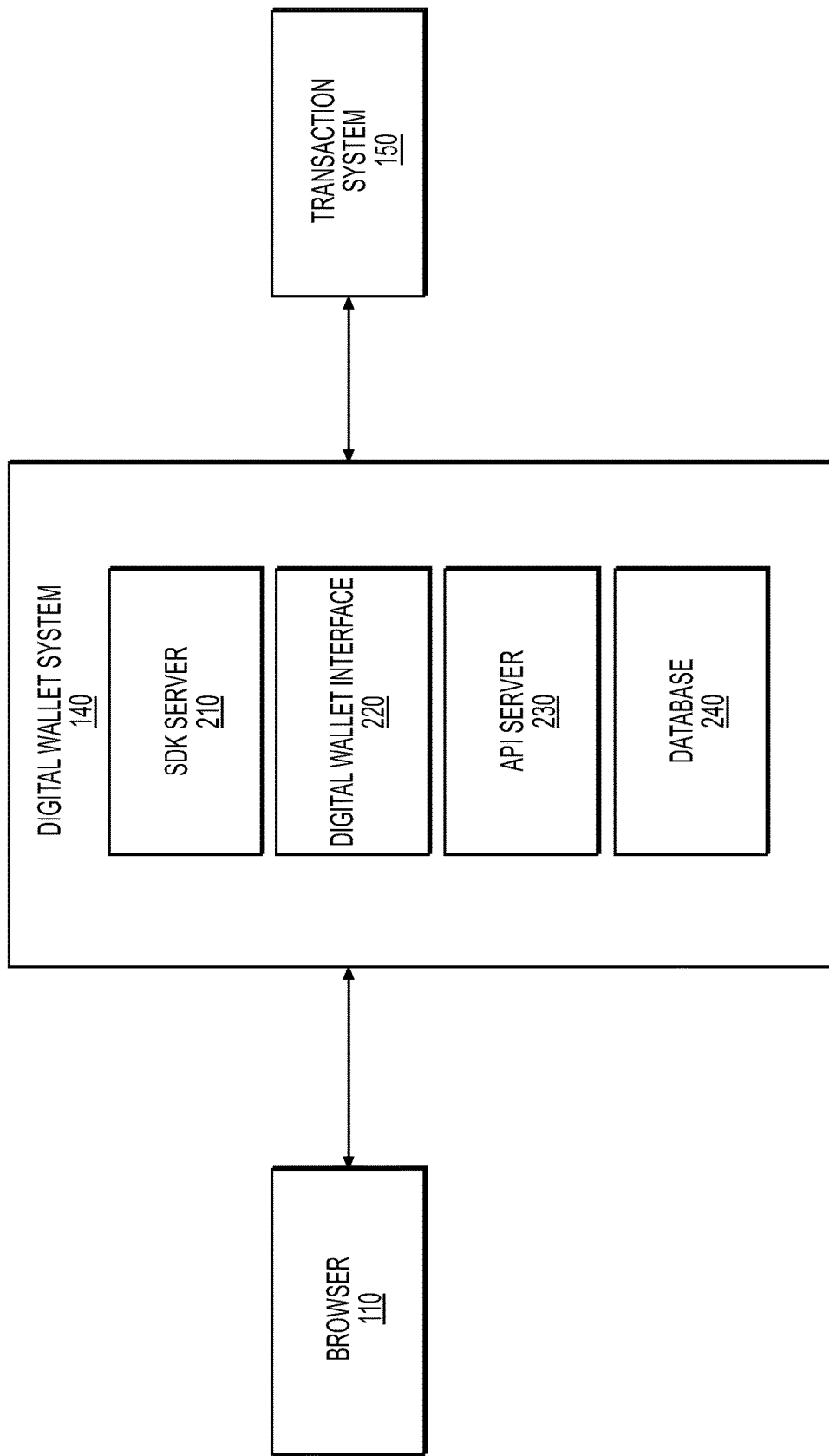
FIG. 2 depicts a block diagram of an exemplary digital wallet system, according to one aspect of the present disclosure.

FIG. 2 shows a block diagram of an exemplary system 200 comprising the browser 110, the wallet digital system 140, and the transaction system 150. The digital wallet system 140 comprises a software development kit (SDK) server 210, a digital wallet interface 220, an application programming interface (API) server 230, and a database 240. The SDK server 210 may provide various SDK functions (or SDK) that the merchant system 120 may utilize to interact with the digital wallet interface 220. That is, the SDK provided by the SDK server 210 may include classes that may expose various functions for initiating and processing the digital wallet services (e.g., an express checkout and a OTPA or two-factor authentication (2FA) functionality). In one embodiment, the SDK may be written in European Computer Manufacturer's Association Script 6 (ES6) JavaScript. Further, the SDK may be compiled, using a webpack, into a single minified JavaScript (JS) file that may then be deployed to a cloud storage resource. The cloud storage resource may be restricted to be accessible via a content delivery network service endpoint, which may be fronted by an authentication protected domain. In another embodiment, alternative deployment method may be utilized by the merchant system 120 in order to securely transmit various payment information stored in the merchant system 120.

Still referring to FIG. 2, the digital wallet interface 220 is provided to the merchant system 120 to integrate the digital wallet interface 220 into the merchant website on the browser 110. The merchant system 120 may utilize the SDK provided by the SDK server 210 to integrate the digital wallet interface 220 and to display on the browser 110. In one exemplary embodiment, the digital wallet interface 220 may be a React application using Create React App (CRA). Key libraries of the digital wallet interface 220, for example, may be predictable state containers (e.g., Redux) for state management (along with React Hooks), a Material User Interface for standard components and cross browser compatibility, Axios for Hypertext Transfer Protocol (HTTP) requests, and Syntactically Awesome Style Sheets (SASS) for styling. The digital wallet interface 220 may be compiled, for example, using CRA and then deployed to a cloud storage resource. The cloud storage resource may be restricted to be accessible via a content delivery network service endpoint, which in turn may be fronted by a basic authentication protected domain. In one embodiment, the digital wallet interface 220 may be deployed differently so that a checkout experience provided by the digital wallet system 140 may be securely launched on a per merchant basis.

Still referring to FIG. 2, the API server 230 may provide various APIs that the merchant system 120 may utilize to run digital wallet services. For example, the API server 230 may provide a digital wallet API that may allow the merchant system 120 to enroll customers in the digital wallet system 140, authenticate customers, validate an OTPA or 2FA, provide tokens, submit payments, and/or authorize payments via the digital wallet interface 220 provided on the browser 110. The digital wallet API may be written in .NET Core backed by a database 240 (e.g., Structured Query Language (SQL) Server database). The digital wallet API may be Representational State Transfer (or RESTful) API and may support JavaScript Object Notation (JSON) format as transaction request and response formats. In one embodiment, the digital wallet API may be documented with Swagger. The digital wallet API code may be deployed to a web service. The digital wallet API may be restricted to be accessible via a content delivery network service endpoint, which in turn may be fronted by a basic authentication protected domain.

The methods described hereinafter, by utilizing the systems 100 and 200 described above, solve the aforementioned technological problems arising in the conventional digital wallet technology. That is, the digital wallet systems and methods of the present disclosure described herein are directed to an improvement in the conventional digital wallet technical field and are practically applicable in the field of digital wallet technology.

Figure 3:
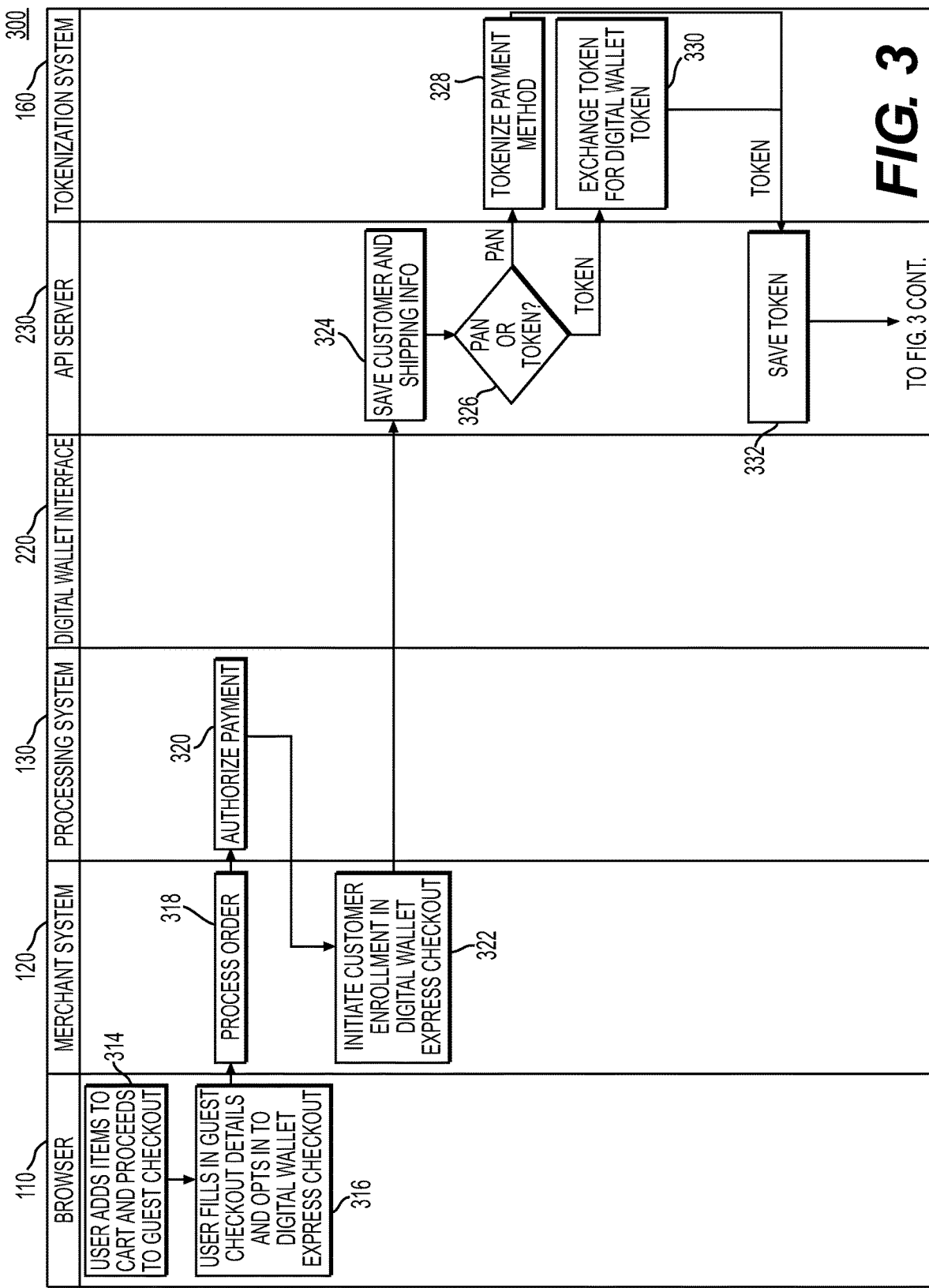
FIG. 3 depicts a flowchart of an exemplary method of executing a digital wallet enrollment and/or transaction, according to one aspect of the present disclosure.
Figure 3:
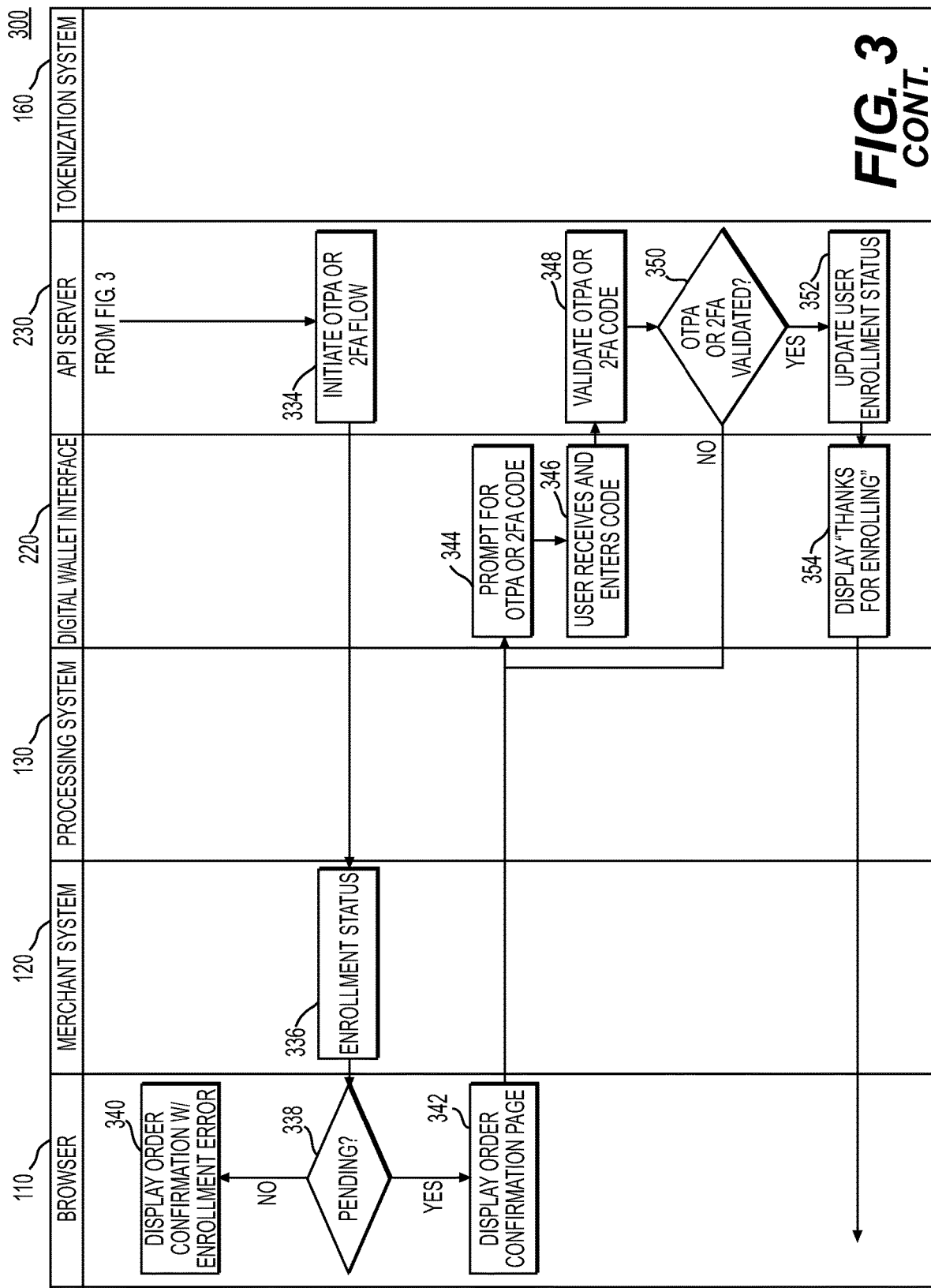

FIG. 3 depicts a flowchart of an exemplary method 300 contemplating a digital wallet enrollment at or during guest checkout on the browser 110 of the merchant system 120. In the method 300, the user 105 (e.g., a customer) may shop at a merchant's website and access the merchant's existing guest checkout to complete the purchase. During the guest checkout process, the user 105 may be asked (e.g., via a checkbox) if the user 105 would like to opt into a digital wallet or a digital wallet service (e.g., digital wallet express checkout service) of the present disclosure. The digital wallet and the digital wallet service may be used interchangeably hereinafter. If the user 105 chooses to opt into the digital wallet express checkout service, the merchant system 120 may notify the digital wallet API of the enrollment request of a user (e.g., the user 105). Upon confirming the purchase by the user 105, the user 105 may then be shown an OTPA or 2FA dialog on the digital wallet interface 220 for the user 105 to complete the enrollment with the digital wallet express checkout service. One exemplary process flow of the method 300, performed in accordance with the systems 100 and 200 above, is described hereinafter.

In one embodiment, at step 314, the user 105 (e.g., a customer) may add items (e.g., products or services) to a cart displayed on the browser 110. The user 105 may then proceed to a guest checkout. At step 316, the user 105 may fill in the information (e.g., payment, personal, and/or shipping information) necessary to complete a purchase transaction via the guest checkout. Further, the user 105 may opt into a digital wallet service (e.g., digital wallet express checkout) provided by the digital wallet system 140. At step 318, the merchant system 120 may process the purchase order of user 105 by transmitting the order details and payment request data to the processing system 130. The processing system 130 may then authorize the payment request at step 320 by communicating with the transaction network 170.

Still referring to FIG. 3, at step 322, the merchant system 120 may initiate an enrollment process for a digital wallet service (e.g., digital wallet express checkout). At step 324, the digital wallet API provided by the API server 230 may save the user information (e.g., payment information, shipping information, email address, phone number, and/or mailing address) into a server(s) or the database(s) 240, in accordance with the digital wallet API described in FIG. 2 above. At step 326, the digital wallet API may determine whether the payment information sent by the merchant system 120 includes, for example, a PAN or a merchant token. At step 328, if the payment information includes a PAN, the tokenization system 160 may tokenize the payment method by generating a digital wallet token. At step 330, if the payment information includes a merchant token, the tokenization system 160 may exchange the merchant token, for example, with the digital wallet token generated by the tokenization system 160. At step 332, the digital wallet API may then save the merchant token received from the merchant system 120 for later processing. In one or more embodiments, the received merchant token may be passed along to various processing platforms.

Still referring to FIG. 3, at step 334, the digital wallet API may initiate an OTPA or 2FA process flow. In one embodiment, an external OTPA or 2FA service may be used to send, for example, a mobile text message (e.g., a short message service (SMS) message) or an email to the phone number and/or the email address provided by the user 105 during a digital wallet service enrollment. In one embodiment, an identification associated with the user 105 may be tied to the user's 105 email or a phone number. Further, an OTPA or 2FA six digit code may be sent via a mobile text message or an email, which may be used to verify the user 105 before the user's 105 data may be used for a payment on one of the acquirer processor's processing platforms.

At step 336, the merchant system 120 may check for the digital wallet enrollment status. At step 338, if the digital wallet enrollment status is no longer pending, the browser 110 may display an order confirmation message along with an enrollment error message to the user 105 at step 340. If the enrollment status is still pending, however, the browser 110 may display the order confirmation page at step 342. At step 344, the digital wallet interface 220 may then display a prompt to the user 105 to request an OTPA or 2FA code (e.g., an OTPA or 2FA six digit code sent via a mobile text message or an email). At step 346, the digital wallet interface 220 may receive the OTPA or 2FA code entered by the user 105. At step 348, the digital wallet API may validate the OTPA or 2FA code. If the OTPA or 2FA is properly validated by the digital wallet API at step 350, the digital wallet API may update the user's 105 digital wallet enrollment status at step 352. However, if the OTPA or 2FA of the user 105 cannot be validated at step 350, then the digital wallet interface 220 may display a prompt to the user 105 to request for the OTPA or 2FA code again. At step 354, the digital wallet interface may display an enrollment confirmation message (e.g., "Thanks for enrolling!").

Figure 4:
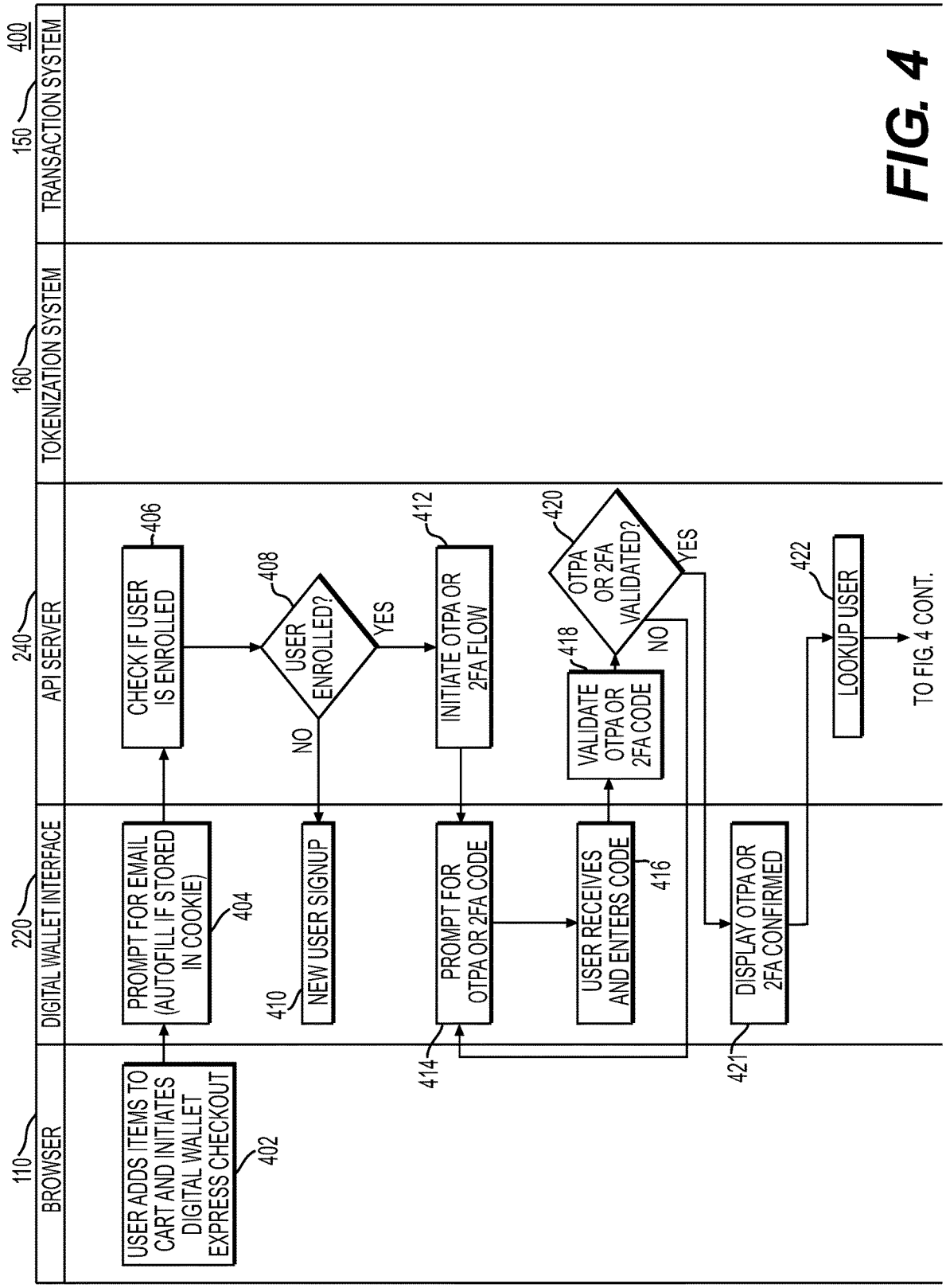
FIG. 4 depicts a flowchart of another exemplary method of executing a digital wallet enrollment and/or transaction, according to one aspect of the present disclosure.
Figure 4:
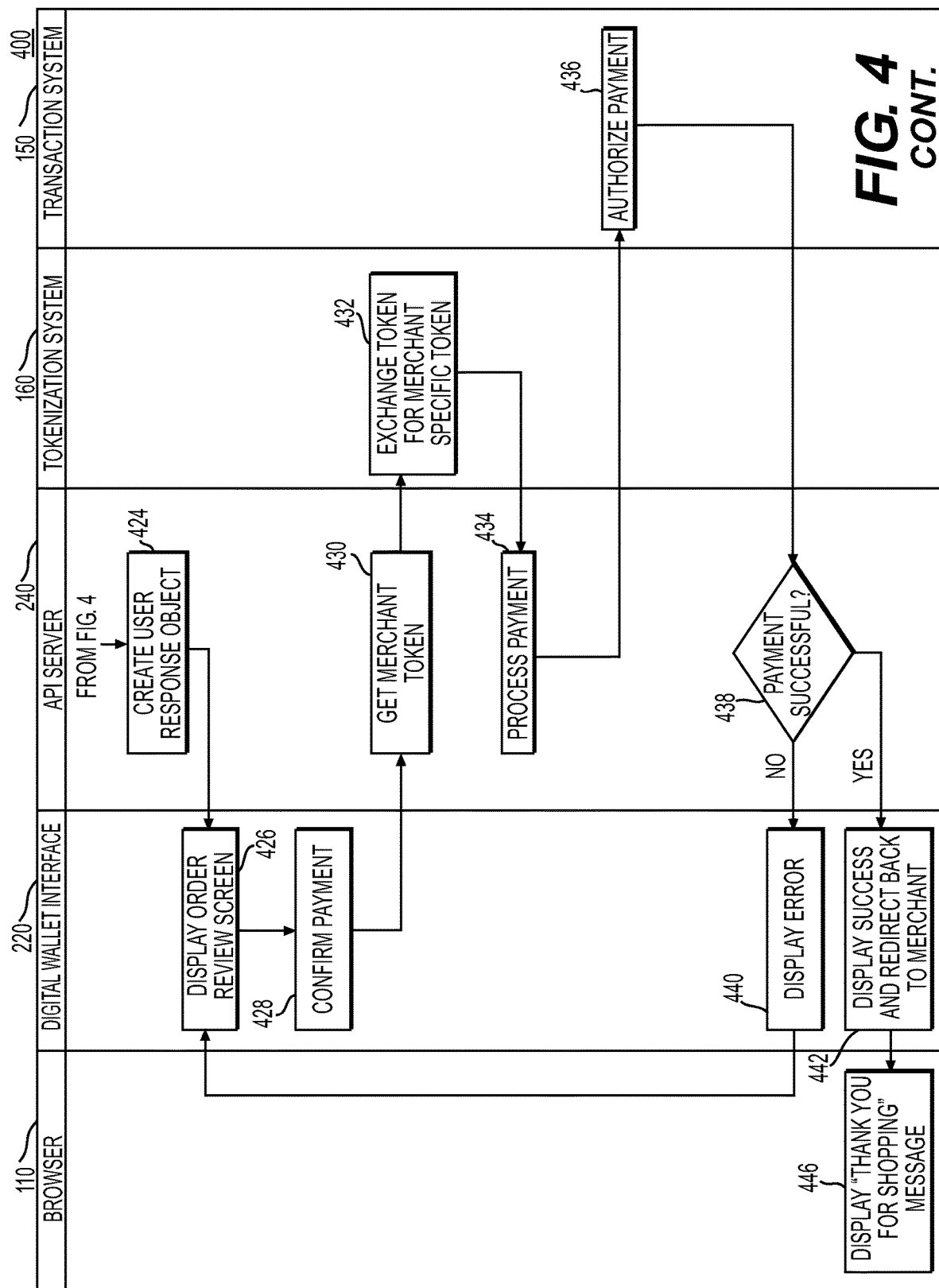

FIG. 4 depicts a flowchart of an exemplary method 400 for performing a digital wallet express checkout process with the user 105 (e.g., a customer) who may have been previously enrolled into the digital wallet system 140 of the present disclosure. One exemplary process flow of the method 400, performed in accordance with the systems 100 and 200 above, is described hereinafter.

In one embodiment, at step 402, the user 105 may add items (e.g., products or services) to a cart provided on the browser 110 of the merchant system 120. In one embodiment, the merchant system 120 may participate in the services provided by the digital wallet of the present disclosure. The user 105 may initiate a digital wallet express checkout process by selecting a digital wallet express checkout option (e.g., a graphical "express checkout" button) displayed on the browser 110. At step 404, the digital wallet interface 220 may display a prompt to the user 105 to request the user's 105 personal information (e.g., name, email address, a phone number, etc.). In one embodiment, the personal information, for example an email address, may be auto-filled if the email address is stored in the browser 110 (e.g., in the cookie of the browser 110). At step 406, the digital wallet API may check whether the user 105 is enrolled in the digital wallet system 140 of the present disclosure. At step 408, if the user 105 is not enrolled in the digital wallet, the digital wallet interface 220 may then initiate a new user enrollment process at step 410. If the user 105 is enrolled in the digital wallet system 140, the digital wallet API may then initiate the OTPA or 2FA flow at step 412, similar to the OTPA or 2FA process described in FIG. 3 above.

Still referring to FIG. 4, at step 414, the digital wallet interface 220 may display a prompt to the user 105 to request for an OTPA or 2FA code. At step 416, the digital wallet interface 220 may provide the OTPA or 2FA code received from the user 105 to the digital wallet API. At step 418, the digital wallet API may validate the received OTPA or 2FA code. At step 420, if the OTPA or 2FA is not validated, the digital wallet interface may then display a prompt to the user 105 to request an OTPA or 2FA code again at step 414. If the OTPA or 2FA is validated, the digital wallet interface 220 may display an OTPA or 2FA confirmation message to the user 105 at step 421.

At step 422, the digital wallet API may look up the information (e.g., shopper identification, name, addresses, payment tokens, etc.) associated with the user 105 enrolled in the digital wallet system 140. At step 424, the digital wallet API may create the user 105 response objects (e.g., name, address, payment methods, etc.). In one embodiment, the user 105 information retrieved by the digital wallet API may include various methods of payment that may be used to complete the purchase transaction. For example, the user 105 may use credit card accounts, bank card accounts, and loyalty point accounts. In one embodiment, the digital wallet interface 220 may present lending options by various card issuers and lenders at points of checkout to allow the user 105 to pay for products or services in installments. Further, the digital wallet API may be connected to banks to enable the user 105 to login via bank portals and connect to the user's 105 bank accounts to pay for products and services online. In one embodiment, the digital wallet interface 220 may offer the user 105 one or more options to enroll, sign up for, and/or apply for one or more payment methods during checkout. For example, one or more digital wallet APIs may connect the digital wallet system 140 to the processing system 130 or third party providers to manage the payment products and/or services of the present disclosure.

At step 426, the digital wallet interface 220 may display the order review screen with user response fields prefilled in the order review screen. At step 428, the user 105 may confirm the payment via the digital wallet interface 220. At step 430, the digital wallet API may receive a token from the merchant system 120 along with the payment confirmation. At step 432, the tokenization system 160 may exchange the merchant token with the digital wallet token. In one embodiment, the digital wallet tokens may not be exposed to the merchant system 120. The digital wallet tokens may be generated when the user 105 adds payment methods and stores the payment methods in the digital wallet "account." During a payment transaction, the digital wallet token may be exchanged for the merchant specific token, which may be used for performing a payment authorization. At step 434, the digital wallet API may transmit the payment request with the merchant specific token to the transaction system 150.

Still referring to FIG. 4, at step 436, the transaction system 150 may communicate with the transaction network 170 to perform the payment authorization process. At step 438, the digital wallet API may determine whether the payment authorization is successful. If the payment authorization is not successful, the digital wallet interface 220 may display an error message to the user 105 at step 440 and may display the order review screen again at step 426, so that the user 105 may re-confirm the payment. In one embodiment, the user 105 may change the method of payment during re-confirmation. For example, the user 105 may switch from using a credit card account to a debit card account to confirm the payment. If the payment authorization is successful, the digital wallet interface 220 may display a success message to the user 105 and redirect the user 105 back to the merchant's browser 110 at step 442. The browser 110 may then display any suitable message (e.g., "Thank you for shopping!") determined by the merchant system 120 for confirming the payment transaction at step 446.

Figure 5:
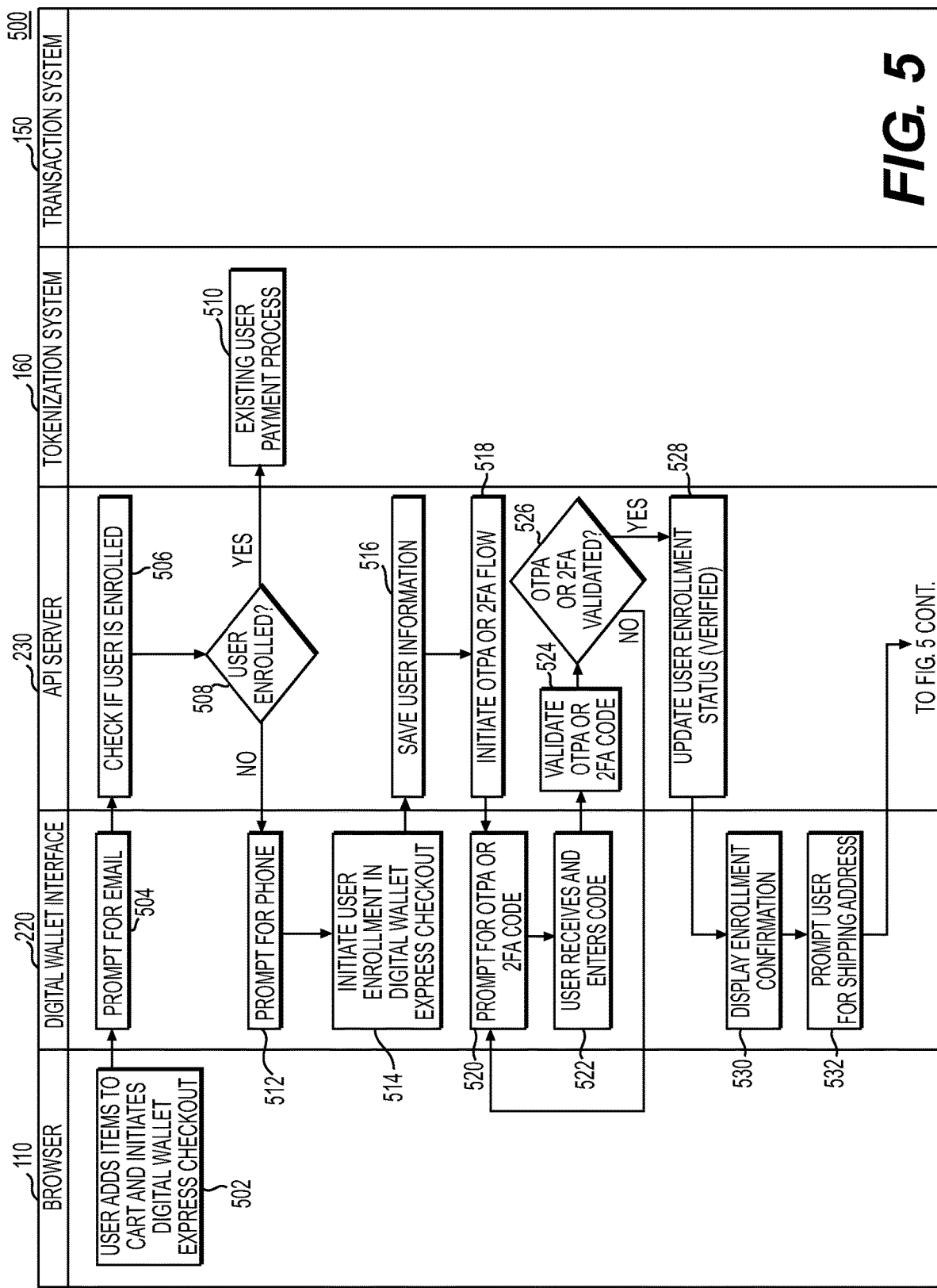
FIG. 5 depicts a flowchart of yet another exemplary method of executing a digital wallet enrollment and/or transaction, according to one aspect of the present disclosure.
Figure 5:
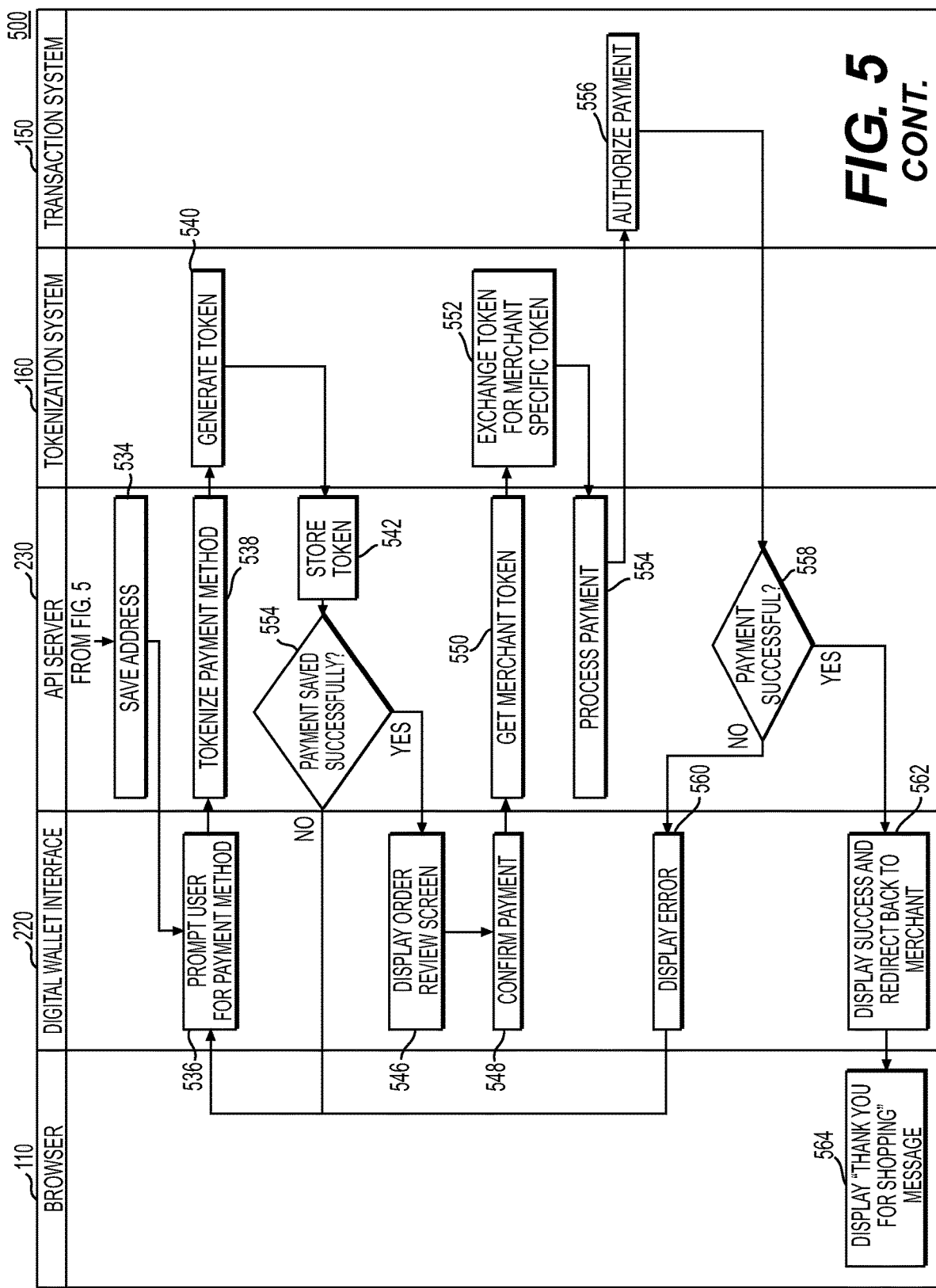

FIG. 5 depicts a flowchart of an exemplary method 500 for performing a digital wallet express checkout process with the user 105 (e.g., a customer) who may not be enrolled in the digital wallet system 140 of the present disclosure. In the method 500, the digital wallet interface 220 may walk the user 105 through enrollment and completion of a digital wallet transaction. Thereafter, the user 105 may be redirected back to the order confirmation page of the merchant's browser 110. One exemplary process flow of the method 500, performed in accordance with the systems 100 and 200 above, is described hereinafter.

In one embodiment, at step 502, the user 105 may add items to a cart displayed on the browser 110 and may initiate a digital wallet express checkout process of the present disclosure. At step 504, the digital wallet interface 220 may display a prompt to the user 105 to request the email address of user 105. At step 506, the digital wallet API may check whether the user 105 is enrolled in the digital wallet system 140 of the present disclosure. At step 508, if the digital wallet API determines that the user 105 is enrolled in a digital wallet service (e.g., the digital wallet express checkout), an existing user payment process may be performed at step 510. For example, the digital wallet express checkout process for the previously enrolled user as described in FIG. 4 above may be performed. If the digital wallet API determines that the user 105 is not enrolled in the digital wallet express checkout at step 508, the digital wallet interface 220 may display a prompt to request a phone number from the user 105 at step 512.

Still referring to FIG. 5, at step 514, the digital wallet interface 220 may initiate a digital wallet enrolment process. At step 516, the digital wallet API may save the user's 105 information into the database 240 at step 516. At step 518, the digital wallet API may initiate an OTPA or 2FA flow. At step 520, the digital wallet interface 220 may display a prompt to request an OTPA or 2FA code from the user 105. At step 522, the user 105 may provide the OTPA or 2FA code to the digital wallet interface 220. At step 524, the digital wallet API may validate the OTPA or 2FA code received from the user 105. If the digital wallet API validates the OTPA or 2FA at step 526, the digital wallet API may update the user 105 enrollment status as being verified at step 528. If the digital wallet API cannot validate the OTPA or 2FA, the digital wallet interface 220 may then display a prompt to the user 105 to request the OTPA or 2FA code again at step 520. At step 530, the digital wallet interface 220 may display an enrollment confirmation message at step 530. At step 532, the digital wallet interface 220 may display a prompt to the user 105 to request a shipping address from the user 105.

Still referring to FIG. 5, at step 534, the digital wallet API may save the shipping address received from the user 105. At step 536, the digital wallet interface 220 may display a prompt to request a payment method from the user 105. At step 538, the digital wallet API may request a tokenization of the payment method selected by the user 105. At step 520, the tokenization system 160 may generate a digital wallet token for the payment method selected by the user 105 at step 540. At step 542, the digital wallet API may store the digital wallet token generated by the tokenization system 160 in the database 240. At step 554, the digital wallet API may determine whether the payment method has been successfully saved. If the payment has not been saved successfully by the digital wallet API, the digital wallet interface 220 may display a prompt to the user 105 again to request a payment method. If the payment has been saved successfully by the digital wallet API, the digital wallet interface 220 may display an order review screen at step 546. At step 548, the user 105 may confirm the payment of the purchase on the digital wallet interface 220. At step 550, the digital wallet API may receive a token from the merchant system 120. At step 552, the tokenization system 160 may exchange the generated digital wallet token with the token received from the merchant system 120.

Still referring to FIG. 5, at step 554, the digital wallet API may send a payment request to the transaction system 150 to request processing of the payment. At step 556, the transaction system 150 may communicate with the transaction network 170 to authorize the payment. At step 558, the digital wallet API may determine whether the payment is successful. If the payment is not authorized, the digital wallet interface 220 may then display an error message to the user 105 at step 560. The digital wallet interface 220 may then display a prompt to the user 105 to request for the payment method again at step 536. If the payment is successfully authorized, the digital wallet interface 220 may display a success message and redirect the user 105 back to the merchant website on the browser 110 at step 562. At step 564, the browser 110 may then display a suitable message (e.g., "Thank you for shopping!") determined by the merchant system 120.

Figure 6:
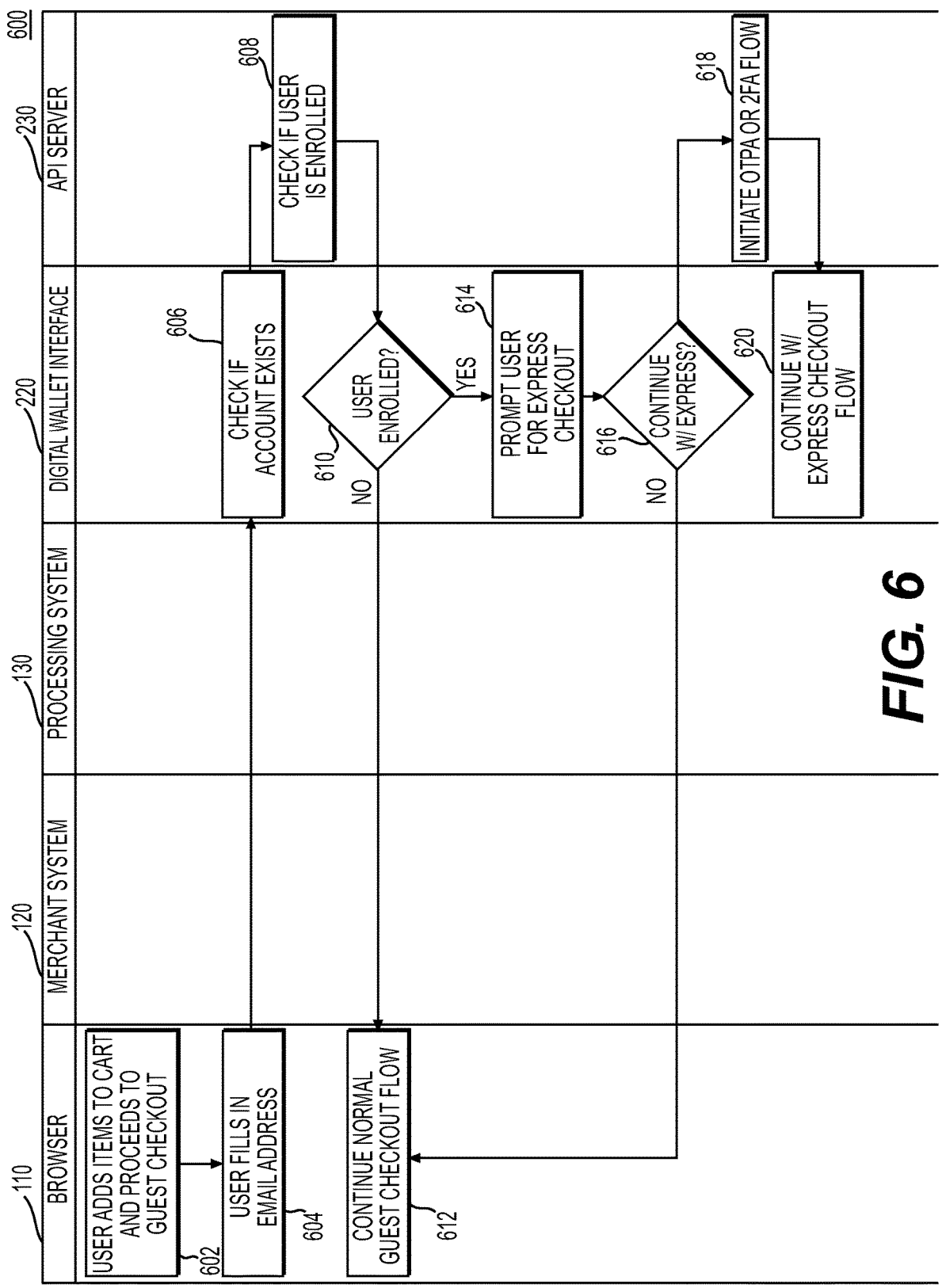
FIG. 6 depicts a flowchart of yet another exemplary method of executing a digital wallet enrollment and/or transaction, according to one aspect of the present disclosure.

FIG. 6 depicts a flowchart of an exemplary method 600 for performing a digital wallet express checkout process with the user 105 (e.g., a customer) who may use a guest checkout link or option to start the checkout process on a merchant's website. In the method 600, the merchant system 120 may be integrated with the digital wallet of the present disclosure. As such, when the user 105 enters the email address, the user 105 may be prompted to use the digital wallet express checkout instead of proceeding with the guest checkout. One exemplary process flow of the method 600, performed in accordance with the systems 100 and 200 above, is described hereinafter.

In one embodiment, at step 602, the user 105 may add items to a cart displayed on the browser 110 and may proceed to a guest checkout provided by the browser 110. At step 604, the user 105 may enter an email address into the browser 110. At step 606, the digital wallet interface 220 may proceed to initiate the process of checking if the user 105 is enrolled in the digital wallet system 140 of the present disclosure (e.g., receive input (e.g., an email address or a phone number) from the user). At step 608, the digital wallet API may check if the user 105 is enrolled in the digital wallet express checkout. If the digital wallet interface 220 determines that the user 105 is not enrolled in the digital wallet express checkout at step 610, then the guest checkout process in accordance with the merchant system 120 may be performed at step 612. If the user 105 is enrolled in the digital wallet express checkout, the digital wallet interface 220 may display a prompt at step 614 to the user 105 to determine whether the user 105 wishes to continue the digital wallet express checkout process at step 616. If the user 105 does not wish to continue with the digital wallet express checkout, then the guest checkout process in accordance with the merchant system 120 may be performed at step 612. At step 618, if the user 105 wishes to continue with the digital wallet express checkout flow, the digital wallet API may initiate the OTPA or 2FA process. At step 620, the digital wallet system 140 may continue with the digital express checkout process as described in FIGS. 4 and 5 above.

FIGS. 7A-8B show exemplary graphical user interfaces of the browser 110 and the digital wallet interface 220. FIGS. 7A-8B may be described hereinafter in tandem with the flowcharts depicted in FIGS. 9A-B for performing exemplary methods of performing electronic transactions using the digital wallet system 140 of the present disclosure.

Figure 7A:
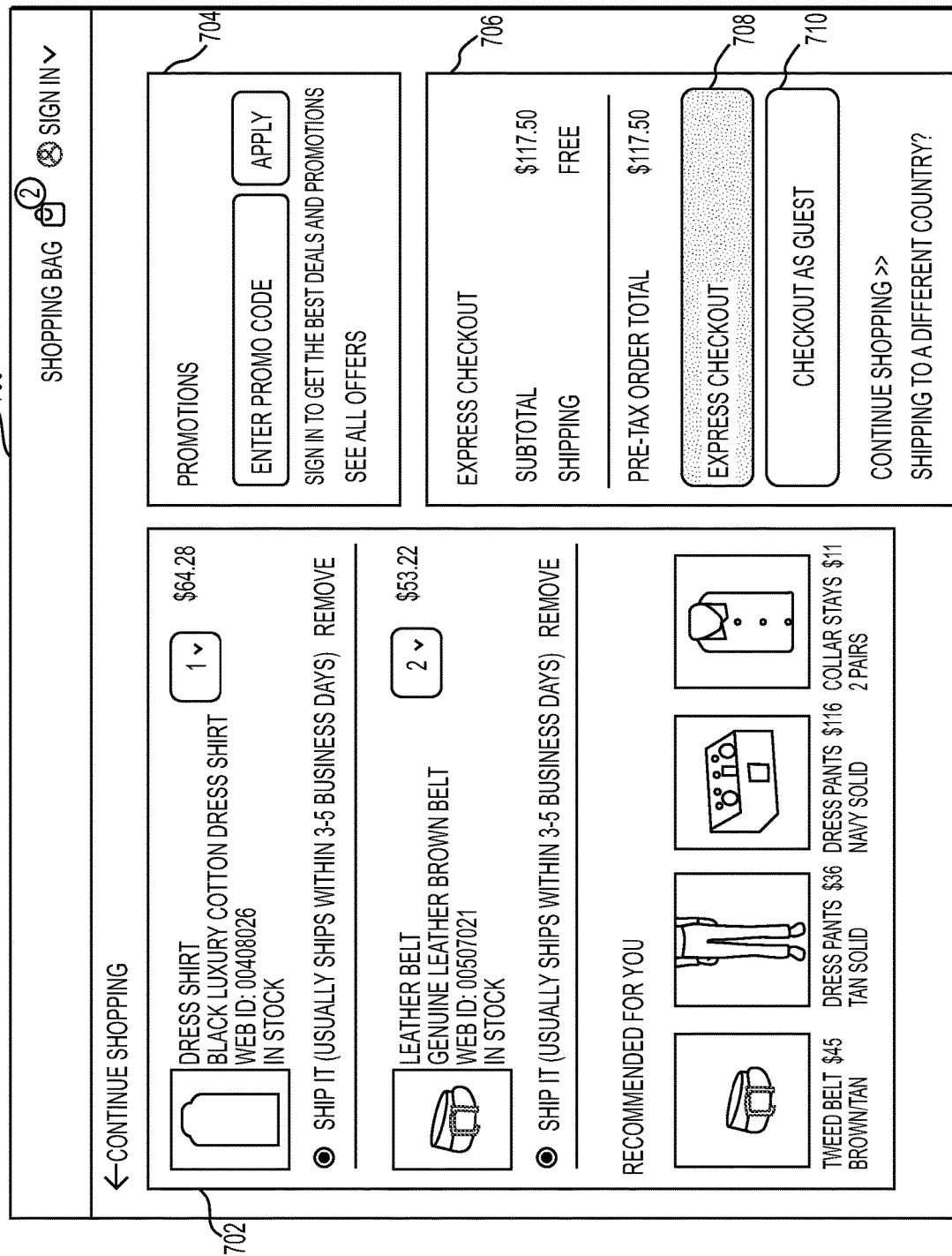
Figure 9A:
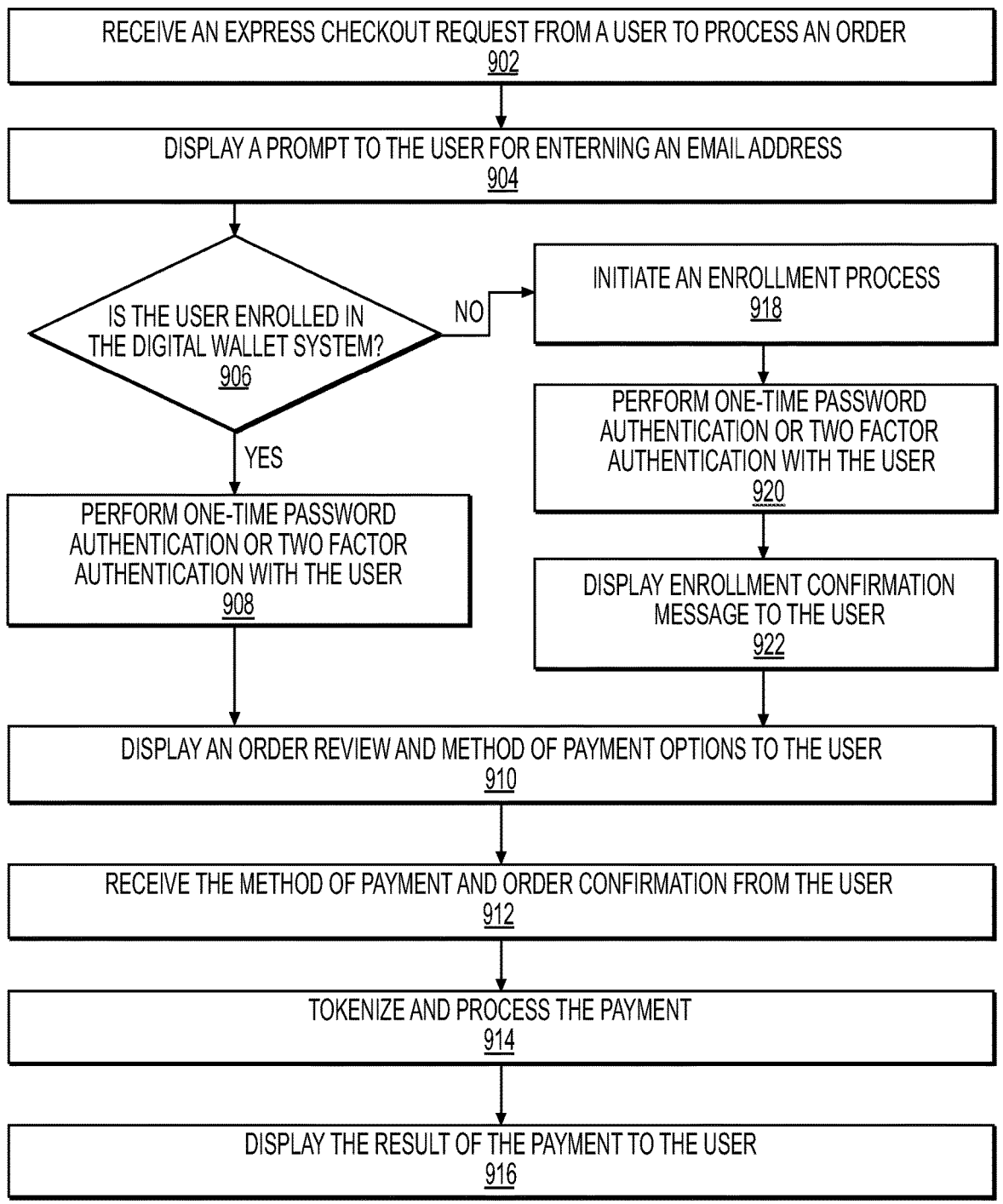
FIG. 9A depicts a flowchart of an exemplary method of executing a digital wallet enrollment and/or transaction, according to one aspect of the present disclosure.

FIG. 9A depicts a flowchart of an exemplary method for performing an electronic transaction using the digital wallet system 140 of the present disclosure. In one embodiment, a method 900 may be performed by the processing system 130 (e.g., the digital wallet system 140, transaction system 150, and the tokenization system 160 thereof). In one embodiment, at step 902, the digital wallet system 140 may receive a digital wallet express checkout request from the user 105 in order to process an order on a merchant's website on the browser 110. For example, the user 105 may interact with the merchant's webpage 700 as shown in FIG. 7A. In one embodiment, the webpage 700 may include a shopping item section 702, promotion section 704, and a checkout section 706. The checkout section 706 may display purchase order information (e.g., order total), express checkout button 708 (e.g., digital wallet express checkout), and/or a guest checkout button 710. In one embodiment, the user 105 may request the digital wallet express checkout by pressing the express checkout button 708.

When the user 105 presses the express checkout button 708, the digital wallet interface 220 may display a prompt to the user 105 for entering an email address at step 904. For example, the digital wallet interface 220 may provide an express checkout window 802 as shown in FIG. 8A. The express checkout window 802 may include an email address input field 806 and a button 808 for continuing the express checkout. The user 105 may enter an email address in the email address input field 806. At step 906, the digital wallet system 140 may determine whether the user 105 is enrolled in the digital wallet system 140 based on the email address received in the email address input field 806. If the user 105 is enrolled in the digital wallet system 140, the digital wallet system 140 may display a prompt to the user 105 to determine whether the user 105 wishes to continue with the express checkout. In one embodiment, the user 105 may continue the express checkout by pressing an express checkout continue button 808. At step 908, the digital wallet system 140 may perform an OTPA or 2FA with the user 105. In one embodiment, the digital wallet API may send an OTPA or 2FA code to the user 105 via the user's 105 email address or phone number stored in the digital wallet system 140. The digital wallet interface 220 may then display an OTPA or 2FA prompt 812 on a payment transaction information interface 810 as shown in FIG. 8B. The user 105 may then enter an OTPA or 2FA code (e.g., a six-digit OTPA or 2FA code) into the OTPA or 2FA prompt 812.

Still referring to FIG. 9A, upon validating the OTPA or 2FA at step 908, the digital wallet interface 220 may display an order review and selection options and/or an input field(s) for indicating the method of payment to the user 105 at step 910. At step 912, the digital wallet system 140 may then receive the method of payment and order confirmation from the user 105. At step 914, the tokenization system 160 may tokenize the payment method provided by the user 105 and/or exchange a digital wallet token with a merchant specific token received from the merchant system 120, in the similar manner as described in FIGS. 1-5 above. Further, the transaction system 150 may communicate with the transaction network 170 to authorize and complete the payment, in the similar manner as described in FIGS. 1-6 above. At step 916, the browser 110 may display a message indicating the result of the payment to the user 105.

Still referring to FIG. 9A, if the user 105 is not enrolled in the digital wallet system 140 at step 906, the digital wallet system 140 may initiate an enrollment process at step 918. The digital wallet system 140 may then process the enrollment by performing an OTPA or 2FA with the user 105 at step 920 in the similar manner as disclosed above at step 908. At step 922, upon verification of the OTPA or 2FA performed at step 920, the digital wallet system 140 may create a digital wallet account for the user 105 and save the user 105 information into the digital wallet system 140 (e.g., in the database 240). Further, the digital wallet interface 220 may display an enrollment confirmation message to the user 105 after the user 105 has been enrolled into the digital wallet system 140. After enrolling the user 105 into the digital wallet system 140, the digital wallet system 140 may proceed to step 910 to complete the payment transaction as described above.

Figure 9B:
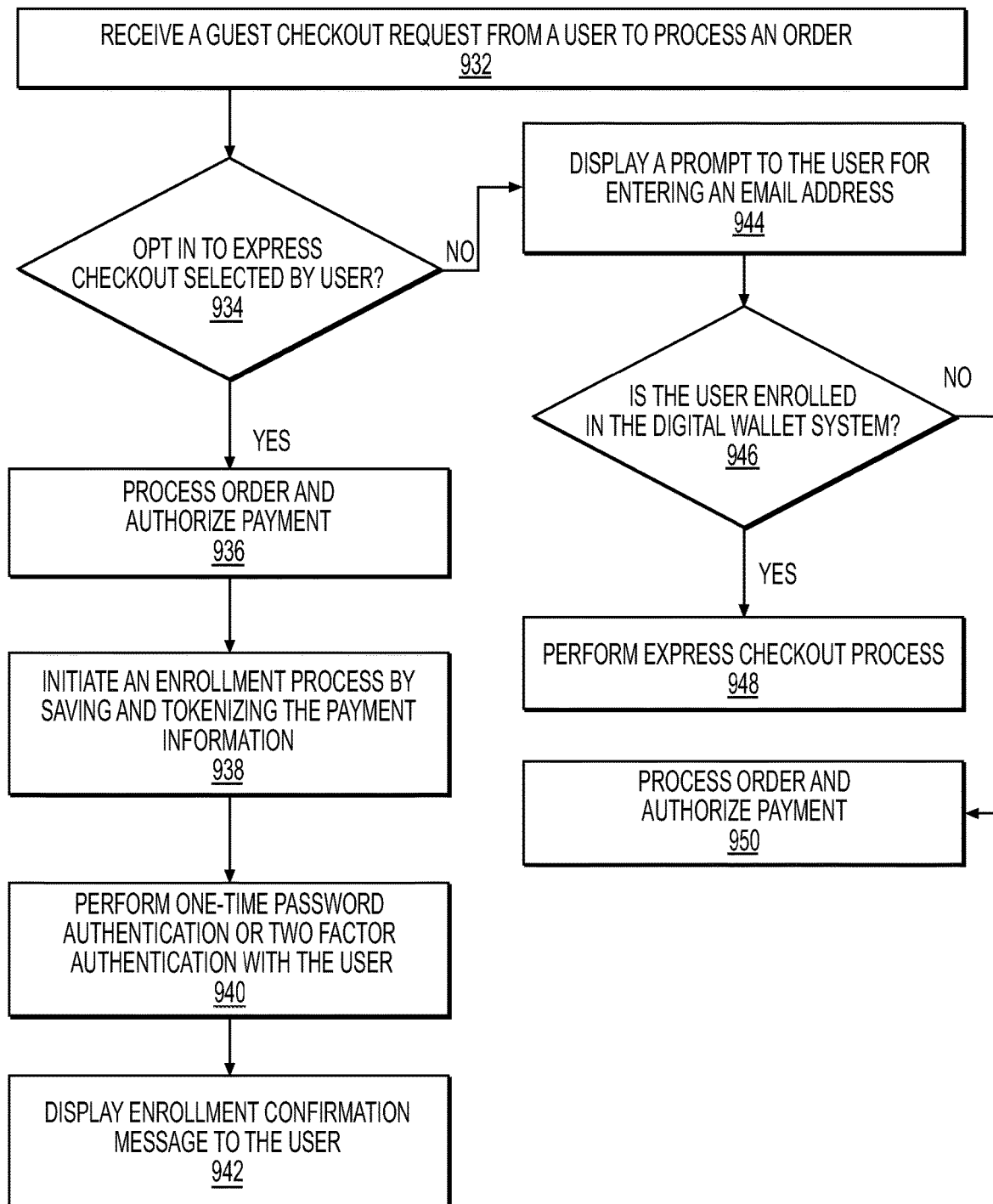
FIG. 9B depicts a flowchart of another exemplary method executing a digital wallet enrollment and/or transaction, according to one aspect of the present disclosure.

FIG. 9B depicts a flowchart of another exemplary method for performing an electronic transaction using the digital wallet system 140 of the present disclosure. In one embodiment, a method 930 may be performed by the processing system 130 (e.g., the digital wallet system 140, transaction system 150, and the tokenization system 160 thereof). At step 932, the digital wallet system 140 may receive a guest checkout request from the user 105 in order to process an order on a merchant's website on the browser 110. For example, the user 105 may select the guest checkout button 710 as shown in the webpage 700 of FIG. 7A.

Figure 7B:
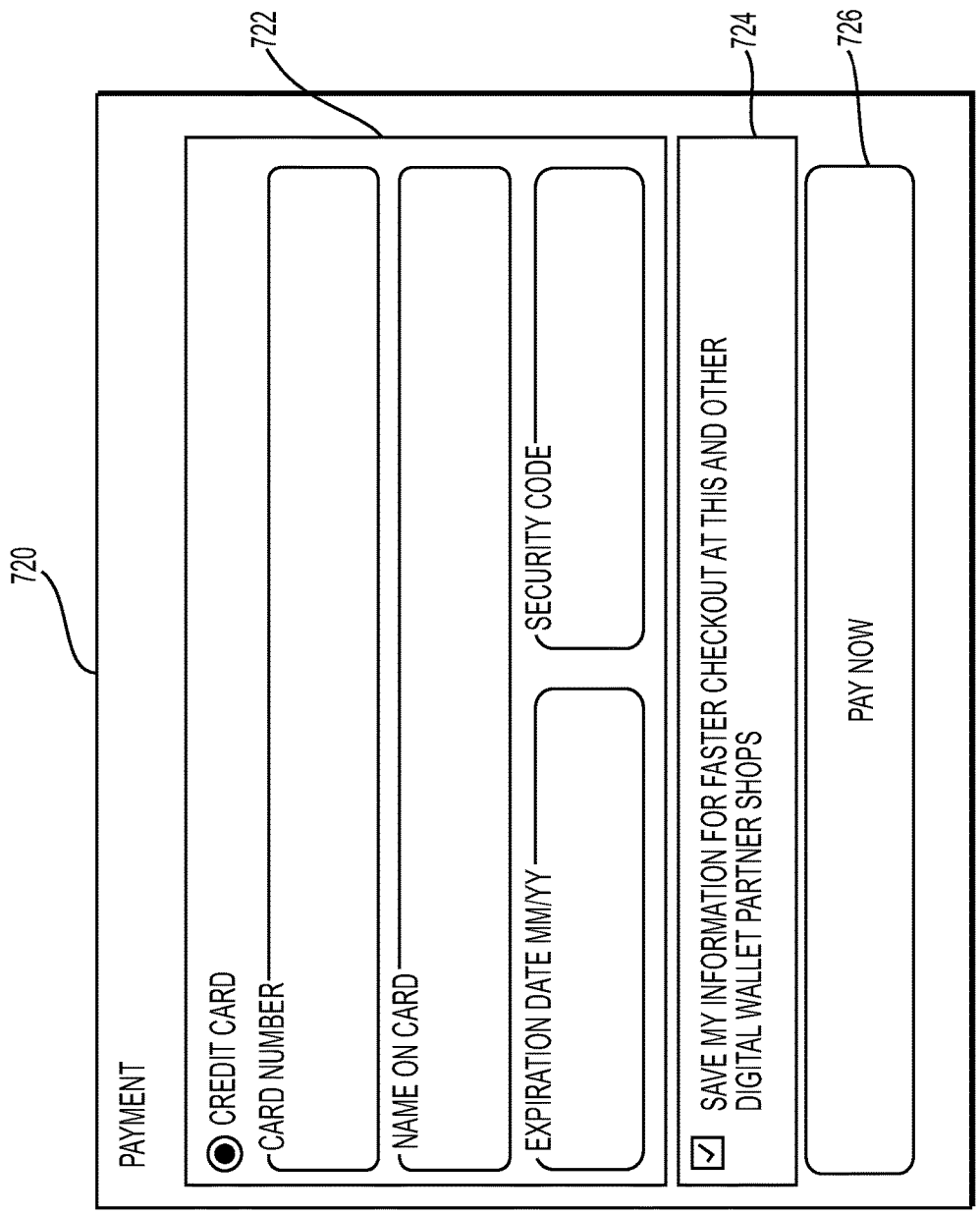

Still referring to FIG. 9B, the browser 110 may display a prompt to the user 105 for selecting an option to opt into a digital wallet express checkout at step 934. In one embodiment, the browser 110 may show a guest checkout window 720 as shown in FIG. 7B. The guest checkout window 720 may include a payment information section 722, a digital wallet express checkout opt-in section 724, and/or a payment confirmation button 726. If the user 105 selects the check box shown in the opt-in section 724, the transaction system 150 may process the order made by the user 105 and may authorize the payment by communicating with the transaction network 170 at step 938. After completing the payment at step 938, the digital wallet system 140 may perform an OTPA or 2FA with the user 105 at step 940 in the similar manner described above in FIG. 9A at steps 908 and 920. Upon verifying the OTPA or 2FA authentication with the user 105, the digital wallet system 140 may enroll the user 105 into the digital wallet system 140. The merchant website 700 of the browser 110, may then display an enrollment confirmation message to the user at step 942.

Still referring to FIG. 9B, if the user 105 does not opt into the digital wallet express checkout option at step 934, the digital wallet interface 220 may display a prompt to the user requesting to enter an email address or a phone number at step 944. At step 946, the digital wallet system 140 may then automatically determine whether the user 105 is enrolled in the digital wallet system 140 based on the email address or the phone number provided by the user 105 at step 944. If the user 105 is not enrolled in the digital wallet system 140, the processing system 130 may then proceed to step 950 to process the order and authorize the payment in the similar manner as described at step 936. However, if the user 105 is determined to be enrolled in the digital wallet system 140, based on the email address and the phone number provided by the user 105, then the digital wallet interface 220 may perform the express checkout process at step 948 in the similar manner as described at steps 908-916 in FIG. 9A.

Figure 9C:
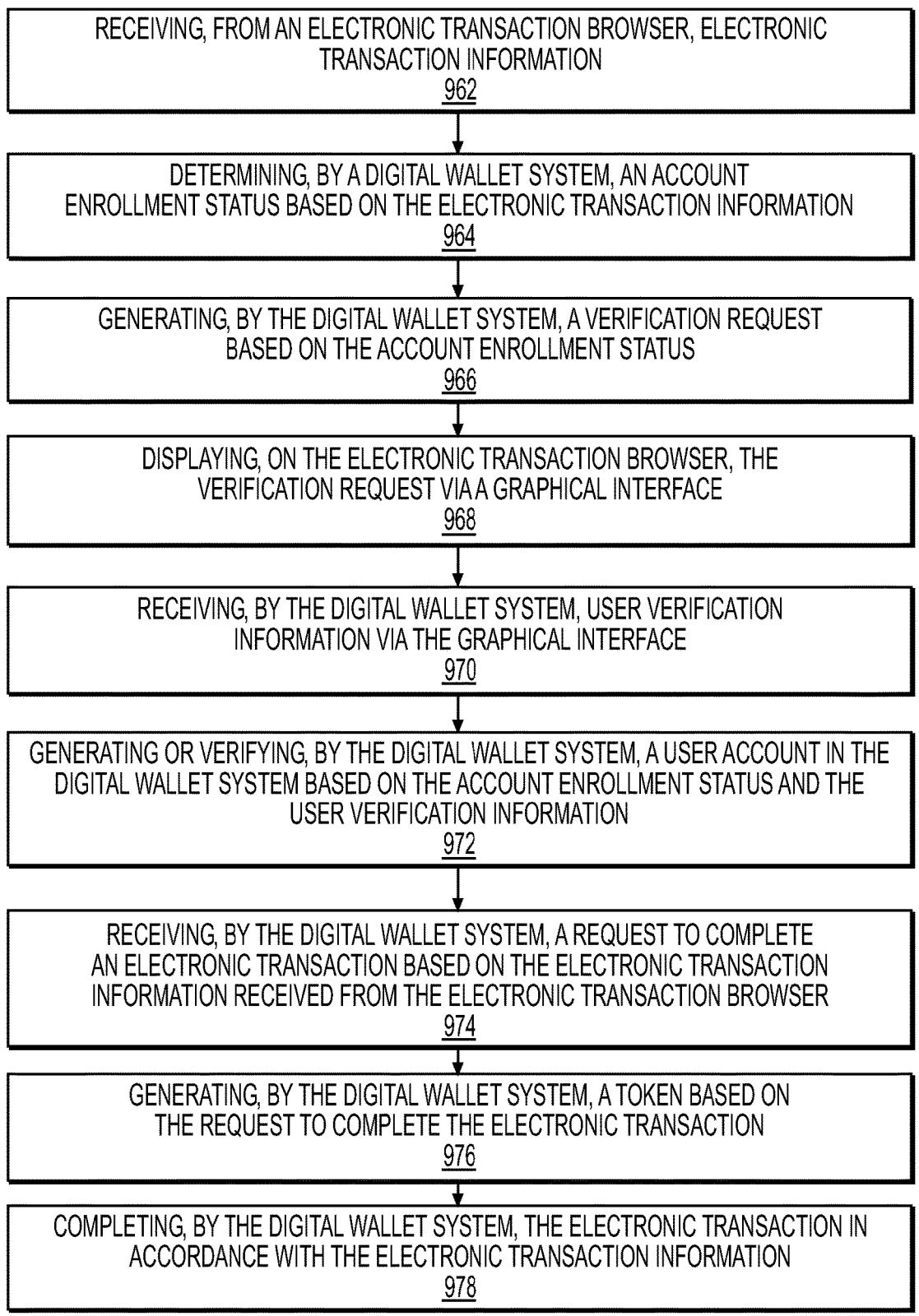
FIG. 9C depicts a flowchart of yet another exemplary method of executing a digital wallet enrollment and/or transaction, according to one aspect of the present disclosure.

FIG. 9C depicts a flowchart of yet another exemplary method 960 for performing an electronic transaction using the digital wallet system 140, according to one aspect of the present disclosure. In one embodiment, a method 960 may be performed by the processing system 130 (e.g., the digital wallet system 140, transaction system 150, and the tokenization system 160 thereof).

At step 962, the processing system 130 may receive, from the browser 110 (e.g., an electronic transaction browser), electronic transaction information. In one embodiment, the electronic transaction information comprises at least one of an email address or a phone number. At step 964, the digital wallet system 140 may determine an account enrollment status based on the electronic transaction information. At step 966, the digital wallet system 140 may generate a verification request based on the account enrollment status.

At step 968, the browser 110 may display the verification request via a graphical interface. At step 970, the digital wallet system 140 may receive user verification information via the graphical interface. In one embodiment, the verification request includes a OTP or a two-factor authentication request. At step 972, the digital wallet system 140 may generate or verify a user account in the digital wallet system 140 based on the account enrollment status and the user verification information. In one embodiment, the digital wallet system 140 may generate the user account when the user is not enrolled in the digital wallet system 140 based on the account enrollment status.

Still referring to FIG. 9C, at step 974, the digital wallet system 140 may receive a request to complete an electronic transaction based on the electronic transaction information received from the electronic transaction browser. In one embodiment, the request to complete the electronic transaction may comprise at least one of an express checkout request or a guest checkout request. At step 976, the digital wallet system 140 may generate a token based on the request to complete the electronic transaction. At step 978, the digital wallet system 140 may complete the electronic transaction in accordance with the electronic transaction information. In one embodiment, the digital wallet system 140 may generate and display a plurality of options for completing the electronic transaction. Further, the plurality of options for completing the electronic transaction may comprise at least one of payment with a credit card account, payment with loyalty points, payment by lending, or payment with a bank account.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 10:
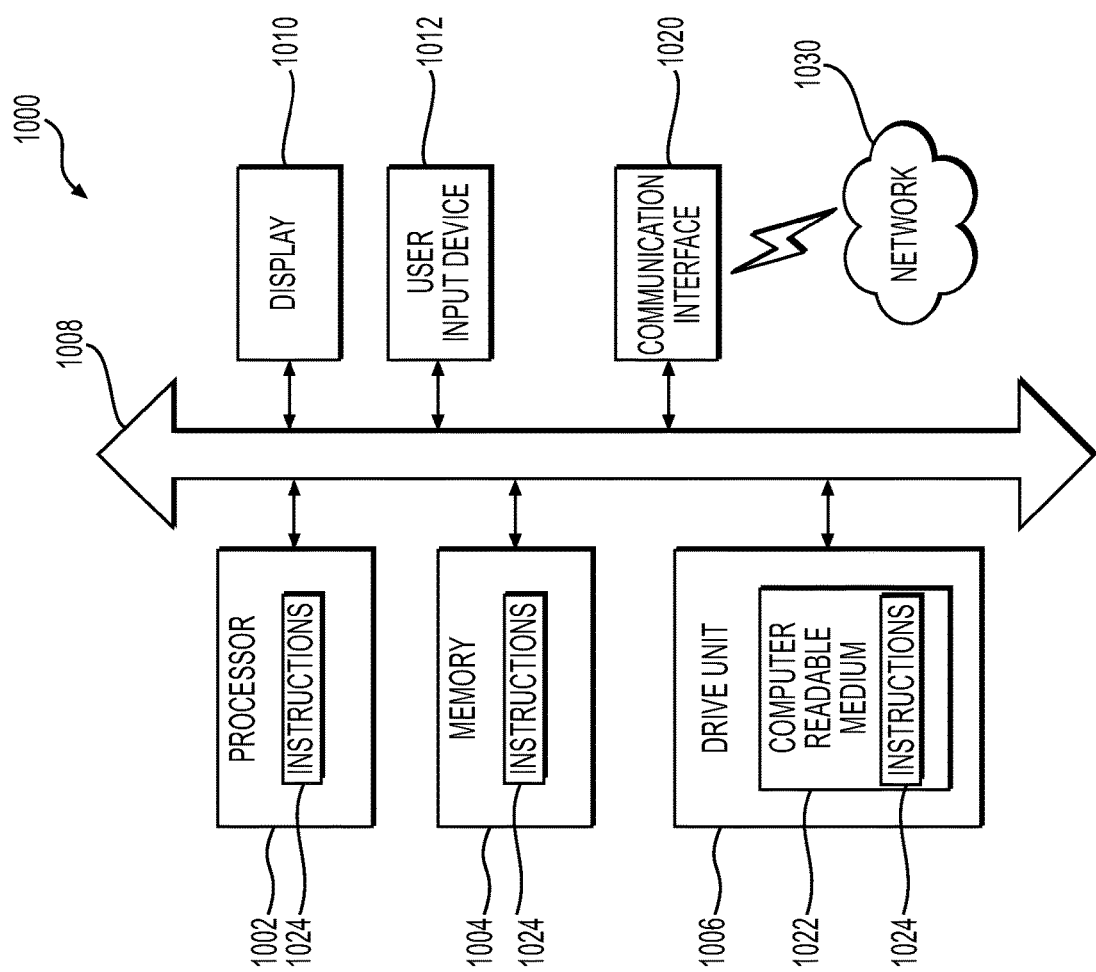
FIG. 10 illustrates a computer system for executing the techniques described herein.

FIG. 10 illustrates a computer system designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may further include a display unit 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control, or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g., software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1030 can communicate voice, video, audio, images, or any other data over the network 1030. Further, the instructions 1024 may be transmitted or received over the network 1030 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1030, external media, the display 1010, or any other components in system 1000, or combinations thereof. The connection with the network 1030 may be a physical connection, such as a wired Ethernet connection or may be established wirelessly as discussed below. Likewise, the additional connections with other components of the system 1000 may be physical connections or may be established wirelessly. The network 1030 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 1030. The network 1030 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1030 may include wide area networks (WAN), such as the Internet, local area networks (LAN), campus area networks, metropolitan area networks, a direct connection such as through a Universal Serial Bus (USB) port, or any other networks that may allow for data communication. The network 1030 may be configured to couple one computing device to another computing device to enable communication of data between the devices. The network 1030 may generally be enabled to employ any form of machine-readable media for communicating information from one device to another. The network 1030 may include communication methods by which information may travel between computing devices. The network 1030 may be divided into sub-networks. The sub-networks may allow access to all of the other components connected thereto or the sub-networks may restrict access between the components. The network 1030 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for executing an electronic transaction with a merchant using a digital wallet, comprising:

generating, by a processing system comprising a digital wallet system, an encrypted token comprising encrypted information and a pseudorandom number in response to storing a payment method for a user in a user account associated with the digital wallet system, wherein the encrypted token is uniquely associated with a combination of the user and the merchant;

receiving, from an electronic transaction browser, electronic transaction information associated with the user;

determining, by the processing system, an account enrollment status based on the electronic transaction information;

generating, by the processing system, a verification request based on the account enrollment status;

displaying, on the electronic transaction browser, the verification request via a graphical interface;

receiving, by the processing system, user verification information via the graphical interface;

verifying, by the processing system, the user account in the digital wallet system based on the account enrollment status and the user verification information;

receiving, by the processing system, a request to complete the electronic transaction associated with the electronic transaction information received from the electronic transaction browser, wherein the request to complete the electronic transaction includes a merchant token, and wherein the merchant token is associated with the merchant and is for authenticating and authorizing the electronic transaction; and based on the request to complete the electronic transaction, completing, by the processing system, the electronic transaction by:

exchanging the merchant token with the encrypted token, wherein the merchant token and the encrypted token exclude sensitive data; and using the encrypted token to perform a payment authorization for the electronic transaction.

2. The method of claim 1, further comprising: generating the user account when the user is not enrolled in the digital wallet system based on the account enrollment status.

3. The method of claim 1, wherein the request to complete the electronic transaction comprises at least one of an express checkout request or a guest checkout request.

4. The method of claim 1, wherein the electronic transaction information comprises at least one of an email address or a phone number.

5. The method of claim 1, wherein the verification request includes a one-time password authentication request or a two-factor authentication request.

6. The method of claim 1, further comprising:
generating and displaying, by the digital wallet system, a plurality of options for completing the electronic transaction.

7. The method of claim 6, wherein the plurality of options for completing the electronic transaction comprises at least one of payment with a credit card account, payment with loyalty points, payment by lending, or payment with a bank account.

8. The method of claim 1, wherein the encrypted token comprises a low-value token or a high-value token.

9. A system comprising:
one or more computer readable media storing instructions for executing an electronic transaction with a merchant using a digital wallet; and
one or more processors configured to execute the instructions to perform operations comprising:
generating, by a processing system comprising a digital wallet system, an encrypted token comprising encrypted information and a pseudorandom number in response to storing a payment method for a user in a user account associated with the digital wallet system, wherein the encrypted token is uniquely associated with a combination of the user and the merchant;
receiving, from an electronic transaction browser, electronic transaction information associated with the user;
determining, by the processing system, an account enrollment status based on the electronic transaction information;
generating, by the processing system, a verification request based on the account enrollment status;
displaying, on the electronic transaction browser, the verification request via a graphical interface;
receiving, by the processing system, user verification information via the graphical interface;
verifying, by the processing system, the user account in the digital wallet system based on the account enrollment status and the user verification information;
receiving, by the processing system, a request to complete the electronic transaction associated with the electronic transaction information received from the electronic transaction browser, wherein the request to complete the electronic transaction includes a merchant token, and wherein the merchant token is associated with the merchant and is for authenticating and authorizing the electronic transaction; and
based on the request to complete the electronic transaction, completing, by the processing system, the electronic transaction by:

exchanging the merchant token with the encrypted token, wherein the merchant token and the encrypted token exclude sensitive data; and using the encrypted token to perform a payment authorization for the electronic transaction.

10. The system of claim 9, the operations further comprising:
generating the user account when the user is not enrolled in the digital wallet system based on the account enrollment status.

11. The system of claim 9, wherein the request to complete the electronic transaction comprises at least one of an express checkout request or a guest checkout request.

12. The system of claim 9, wherein the electronic transaction information comprises at least one of an email address or a phone number.

13. The system of claim 9, wherein the verification request includes a one-time password authentication request or a two-factor authentication request.

14. The system of claim 9, the operations further comprising:
generating and displaying, by the digital wallet system, a plurality of options for completing the electronic transaction.

15. The system of claim 14, wherein the plurality of options for completing the electronic transaction comprises at least one of payment with a credit card account, payment with loyalty points, payment by lending, or payment with a bank account.

16. A non-transitory computer-readable medium storing instructions for executing an electronic transaction with a merchant using a digital wallet, the instructions, when executed by one or more processors, causing the one or more processors to perform operations comprising:
generating, by a processing system comprising a digital wallet system, an encrypted token comprising encrypted information and a pseudorandom number in response to storing a payment method for a user in a user account associated with the digital wallet system, wherein the encrypted token is uniquely associated with a combination of the user and the merchant;
receiving, from an electronic transaction browser, electronic transaction information associated with the user;
determining, by the processing system, an account enrollment status based on the electronic transaction information;
generating, by the processing system, a verification request based on the account enrollment status;
displaying, on the electronic transaction browser, the verification request via a graphical interface;
receiving, by the processing system, user verification information via the graphical interface;
verifying, by the processing system, the user account in the digital wallet system based on the account enrollment status and the user verification information;
receiving, by the processing system, a request to complete the electronic transaction associated with the electronic transaction information received from the electronic transaction browser, wherein the request to complete the electronic transaction includes a merchant token, and wherein the merchant token is associated with the merchant and is for authenticating and authorizing the electronic transaction; and
based on the request to complete the electronic transaction, completing, by the processing system, the electronic transaction by:

exchanging the merchant token with the encrypted token, wherein the merchant token and the encrypted token exclude sensitive data; and using the encrypted token to perform a payment authorization for the electronic transaction.

17. The non-transitory computer-readable medium of claim 16, the operations further comprising:

generating the user account when the user is not enrolled in the digital wallet system based on the account enrollment status.

18. The non-transitory computer-readable medium of claim 16, wherein the request to complete the electronic transaction comprises at least one of an express checkout request or a guest checkout request.

19. The non-transitory computer-readable medium of claim 16, wherein the electronic transaction information comprises at least one of an email address or a phone number.

20. The non-transitory computer-readable medium of claim 16, the operations further comprising:

generating and displaying, by the digital wallet system, a plurality of options for completing the electronic transaction, wherein the plurality of options for completing the electronic transaction comprises at least one of payment with a credit card account, payment with loyalty points, payment by lending, or payment with a bank account.

\* \* \* \* \*